(12) United States Patent
Kiyooka et al.

(10) Patent No.: US 12,179,514 B2
(45) Date of Patent: Dec. 31, 2024

(54) POWER TRANSMISSION UNIT

(71) Applicant: KANZAKI KOKYUKOKI MFG. CO., LTD., Amagasaki (JP)

(72) Inventors: Koji Kiyooka, Amagasaki (JP); Ryo Motooka, Amagasaki (JP); Ken Morishita, Amagasaki (JP); Hitoshi Sawada, Amagasaki (JP); Akihiro Ima, Amagasaki (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 0 days.

(21) Appl. No.: 18/193,963

(22) Filed: Mar. 31, 2023

(65) Prior Publication Data
US 2023/0322062 A1 Oct. 12, 2023

(30) Foreign Application Priority Data

Apr. 1, 2022 (JP) ................. 2022-062065

(51) Int. Cl.
| | | |
|---|---|---|
| B60B 35/16 | (2006.01) | |
| B60K 1/00 | (2006.01) | |
| B60K 17/16 | (2006.01) | |
| F16H 57/02 | (2012.01) | |
| F16H 57/037 | (2012.01) | |

(52) U.S. Cl.
CPC ............... *B60B 35/16* (2013.01); *B60K 1/00* (2013.01); *B60K 17/165* (2013.01); *F16H 57/037* (2013.01); *B60Y 2200/223* (2013.01); *F16H 2057/02034* (2013.01); *F16H 2057/02052* (2013.01); *F16H 2057/02056* (2013.01)

(58) Field of Classification Search
CPC ........ F16H 57/037; F16H 2057/02034; F16H 2057/02052; F16H 2057/02056; B60K 1/00; B60K 2001/001; B60K 17/165; B60B 35/16; B60Y 2200/223
See application file for complete search history.

(56) References Cited

U.S. PATENT DOCUMENTS

| | | | | |
|---|---|---|---|---|
| 7,041,023 B2* | 5/2006 | Bologna | ................... | B60K 1/00 475/150 |
| 8,899,381 B2* | 12/2014 | Ebihara | ............... | F16H 57/0423 184/6.12 |
| 8,936,130 B2* | 1/2015 | Hirashita | ............ | B66F 9/07586 180/300 |
| 9,102,226 B2* | 8/2015 | Makino | ................... | B60L 50/61 |
| 11,247,548 B2* | 2/2022 | Devreese | ............. | B60K 17/346 |

(Continued)

FOREIGN PATENT DOCUMENTS

| | | | | | |
|---|---|---|---|---|---|
| JP | 2012154375 A | * | 8/2012 | .......... | B60K 7/0007 |
| JP | 2023124568 A | * | 9/2023 | ............... | F16H 1/20 |
| JP | 2023124640 A | * | 9/2023 | ............... | F16H 1/20 |

*Primary Examiner* — Adam D Rogers
(74) *Attorney, Agent, or Firm* — CANTOR COLBURN LLP

(57) ABSTRACT

Disclosed is a power transmission unit including a motor case that is provided on the same side as a second axle with respect to a center between a first axle and the second axle, separated to right and left, in a right-left direction and that houses the electric motor, a first axle case housing a reduction gear mechanism, a differential gear mechanism, and the first axle, and a second axle case that is fixed to the first axle case in a separable manner and houses the second axle.

5 Claims, 17 Drawing Sheets

(56) References Cited

U.S. PATENT DOCUMENTS

| | | | |
|---|---|---|---|
| 11,247,556 B2* | 2/2022 | Kucharski | B60B 35/122 |
| 11,338,671 B2* | 5/2022 | Tsukamoto | F04B 53/16 |
| 11,713,803 B1* | 8/2023 | Coppola | H02K 5/02 |
| | | | 74/606 R |
| 2013/0145879 A1* | 6/2013 | Nakamura | F16H 57/0441 |
| | | | 74/467 |
| 2020/0266680 A1* | 8/2020 | Fujimoto | H02K 5/225 |
| 2023/0272851 A1* | 8/2023 | Kiyooka | F16H 63/345 |
| | | | 192/219.4 |

* cited by examiner

POWER TRANSMISSION UNIT

CROSS REFERENCES TO RELATED APPLICATIONS

The present invention claims priority under 35 U.S.C. § 119 to Japanese Application, 2022-062065, filed on Apr. 1, 2022, the entire contents of which being incorporated herein by reference.

TECHNICAL FIELD

The present invention relates to an electric-vehicle power transmission unit.

BACKGROUND ART

It is conventionally known that vehicles such as lawn mowing vehicles including a lawn mowing device may travel by driving wheels with an electric motor. Patent Document 1 describes a lawn mowing vehicle that is an electric vehicle using a single electric motor to drive right and left wheels.

PRIOR ART DOCUMENT

Patent Document

Patent Document 1: Japanese Unexamined Patent Application Publication No. 2012-154375

SUMMARY OF INVENTION

Technical Problem

As in the configuration described in Patent Document 1, the electric vehicle, which drives the right and left wheels with the single electric motor, uses a power transmission unit to transmit the power of the electric motor to the wheels. In the power transmission unit, a gear cover portion forming a gear case housing a gear mechanism for power transmission is integrally formed with an axle case portion supporting right and left axles.

Furthermore, to achieve a reduction in the size of the power transmission unit, the electric motor could be placed closer to one of the axles. However, when a unit case is formed by casting such as die-casting, it is difficult to make a mold so as to form a fixing surface of a motor case while keeping the electric motor close to one of the axles and ensuring the strength of a portion connecting the axle case portion and the gear cover portion. Therefore, it is difficult to achieve a size reduction when the case is formed by casting.

An object of the present invention is to achieve a size reduction while making it possible to mold a case housing an axle and a gear mechanism by casting in an electric-vehicle power transmission unit that drives right and left wheels with a single electric motor.

Solution to Problem

The electric-vehicle power transmission unit according to the present invention is an electric-vehicle power transmission unit in which power of an electric motor is transmitted to a first axle and a second axle separated to right and left through a reduction gear mechanism and a differential gear mechanism, and the electric-vehicle power transmission unit includes a motor case that is provided on a same side as the second axle with respect to a center between the first axle and the second axle in a right-left direction and that houses the electric motor, a first axle case housing the reduction gear mechanism, the differential gear mechanism, and the first axle, and a second axle case that is fixed to the first axle case in a separable manner and houses the second axle.

Advantageous Effects of Invention

With the electric-vehicle power transmission unit according to the present invention, in the configuration to drive the right and left wheels with a single electric motor, the second axle case housing the second axle on the same side as the electric motor with respect to the center between the axles may be fixed in a separable manner to the first axle case housing the reduction gear mechanism, the differential gear mechanism, and the first axle. This eliminates the need to provide the connection portion between the axle case portion housing the second axle and the gear cover portion in a single cast, so that a fixing surface of the motor case may be formed in the first axle case while maintaining the necessary configuration of the mold, even when the electric motor is placed close to the second axle. This allows the case housing the axle and the gear mechanism to be molded by casting, while a reduction in the size of the power transmission unit is achieved.

In the above electric-vehicle power transmission unit, a configuration may be such that the first axle case is formed by fixing an inner case element on a side of the electric motor and an outer case element on an opposite side of the electric motor by screwing.

With the above configuration, even when the first axle case has a complex shape, it is easy to form the inner and outer case elements by casting, and thus the first axle case may be easily formed.

In the above configuration, a configuration may be such that the outer case element is obtained by integrally molding an axle case portion housing the first axle and a cover portion covering one side end of the reduction gear mechanism in an axial direction.

With the above configuration, the number of components may be reduced, and thus the manufacturing costs may be reduced.

In the above electric-vehicle power transmission unit, a configuration may be such that the electric motor includes a motor shaft extending in a vehicle right-left direction parallel to an extending direction of the first axle and the second axle, the reduction gear mechanism includes an input gear provided on the motor shaft or an input shaft that is provided on a same axis as the motor shaft and is not rotatable relative thereto, an intermediate gear shaft including an intermediate gear that is meshed with the input gear, and an intermediate gear portion that is provided on the intermediate gear shaft and is meshed with a ring gear provided on an outer peripheral side of the differential gear mechanism, the motor shaft is provided at a different position in a first direction perpendicular to the vehicle right-left direction and at an identical position in a second direction perpendicular to the vehicle right-left direction and the first direction, and the intermediate gear shaft is provided at a different position with respect to the first axle, the second axle, and the motor shaft in the second direction.

With the above configuration, a reduction in the size of the unit may be achieved even when the intermediate gear shaft including the intermediate gear is provided between the input gear of the reduction mechanism and the differential gear mechanism.

In the above electric-vehicle power transmission unit, a configuration may be such that a recessed portion is formed in a portion of the second axle case opposed to the motor case, and part of the motor case enters the recessed portion.

With the above configuration, the electric motor and the second axle may be brought closer to each other, and thus a reduction in the size of the unit may be further achieved.

In the above electric-vehicle power transmission unit, a configuration may be such that a thrust washer is provided between the first axle case and a side bevel gear assembled to the second axle so as not to be rotatable relative thereto, and the thrust washer has higher hardness than the first axle case and is prevented from rotating by a rib formed in the first axle case.

With the above configuration, even when a thrust force is applied in the axial direction to the side bevel gear, the thrust force may be received by the thrust washer having high hardness so as to prevent direct sliding contact of the side bevel gear with the first axle case. Thus, the first axle case may be prevented from being scraped by the side bevel gear while the first axle case may be made of a material having lower hardness, such as aluminum or aluminum alloy.

DESCRIPTION OF EMBODIMENTS

Figure 1:
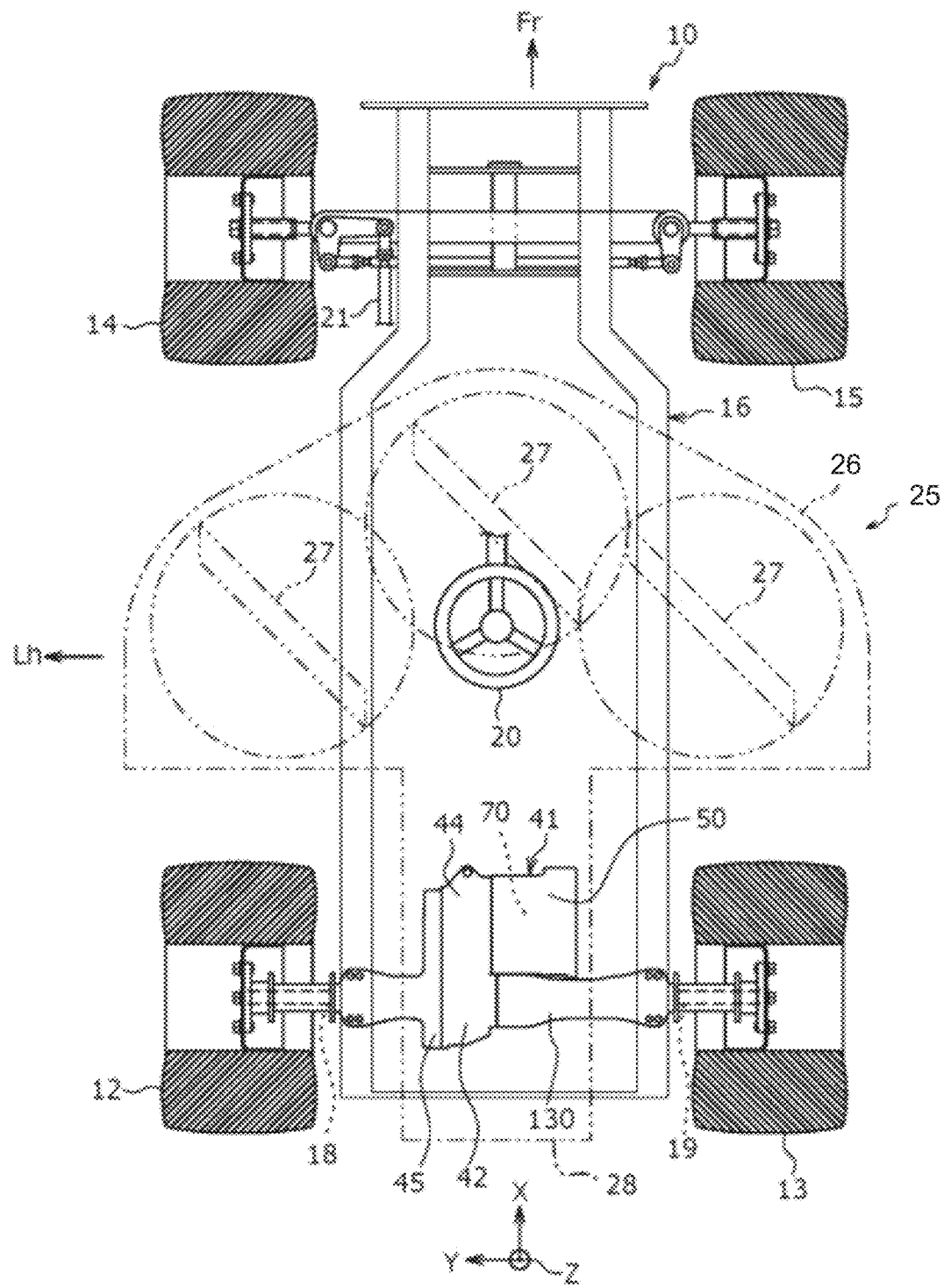
FIG. 1 is a cross-sectional view illustrating an overall configuration of an electric vehicle including an electric-vehicle power transmission unit according to an embodiment of the present invention.

An embodiment of the present invention will be described below in detail with reference to the drawings. In the case described below, an electric-vehicle power transmission unit is mounted on a work vehicle, i.e., a lawn mowing vehicle, but the electric vehicle having the power transmission unit mounted thereon is not limited thereto and is other work vehicles including a work machine that performs any one or more of snow removal work, excavation work, civil engineering work, or agricultural work, off-road multi-utility vehicle (utility vehicle) or all-terrain vehicle (ATV), called buggy, including a loading platform and running on irregular ground, recreational vehicle (RV), or recreational off-highway vehicle (ROV), or may be a vehicle that runs with an electric motor. In the case described below, primarily, an electric vehicle drives two rear wheels with one electric motor, but the vehicle may also be configured to drive two front wheels with one electric motor. In the following description, the similar components in all the drawings are denoted by the same reference numerals.

The electric-vehicle power transmission unit according to the embodiment will be described with reference to FIGS. 1 to 14. In the drawings described below, a vehicle front-back direction is indicated by X, a vehicle right-left direction by Y, and a vehicle up-down direction by Z. The vehicle front-back direction, the vehicle right-left direction, and the vehicle up-down direction are simply described below as the front-back direction, the right-left direction, and the up-down direction. A front side is denoted by "Fr", a left side by "Lh", and an upper side by "Up". X, Y, and Z are perpendicular to each other. The right-left direction corresponds to a vehicle width direction.

FIG. 1 is a cross-sectional view illustrating an overall configuration of a lawn mowing vehicle 10 that is an electric vehicle including an electric-vehicle power transmission unit 41 according to the embodiment. First, the overall configuration of the lawn mowing vehicle 10 will be described, and then the electric-vehicle power transmission unit 41 mounted on the lawn mowing vehicle 10 will be described in detail. The electric-vehicle power transmission unit 41 is hereinafter referred to as the power transmission unit 4sc1. The engineless passenger-type lawn mowing vehicle 10 includes a main frame 16 forming a vehicle body, a left wheel 12 and a right wheel 13, which are two primary driving wheels, supported on the rear side of the main frame 16, and a left wheel 14 and a right wheel 15, which are two driven wheels, supported on the front side. The two rear wheels 12 and 13 on the rear side are connected to the power transmission unit 41 including one electric motor 70. As described below, the power transmission unit 41 includes the electric motor 70 housed in a motor case 50 fixed to an axle case 42, and a power transmission mechanism 77 (FIG. 3) that transmits the power of the electric motor 70 to the left and right wheels 12 and 13. The power transmission mechanism 77 includes a reduction gear mechanism 78 and a differential gear mechanism 118 (FIG. 3), and the left and right wheels 12 and 13 are connected via a first axle 18 and a second axle 19 on both sides in the right-left direction of the differential gear mechanism 118.

In the main frame 16, a driver's seat (not illustrated) is provided on the upper side in a middle portion in the front-back direction, and a steering wheel 20, which is a turning instruction unit, and an accelerator pedal (not illustrated) are provided in front of the driver's seat. By the operation of the steering wheel 20, the left and right wheels 14 and 15 on the front side are steered through a steering mechanism 21 on the front side of the lawn mowing vehicle 10. The steering mechanism 21 uses a conventionally known structure such as the Ackermann system. Mounting boss portions formed on the outer end sides of the axle case 42 and a second axle case 130, which are described below, in the power transmission unit 41 are screwed and suspended in a rear lower portion of the main frame 16 in the front-back direction.

The accelerator pedal corresponds to an acceleration instruction unit that instructs the acceleration of the electric motor 70. The accelerator pedal is supported by the main frame 16 so as to swing around an axis in the right-and-left direction. The electric motor 70 accelerates in a forward direction when the driver steps on a front end portion of the accelerator pedal. The electric motor 70 accelerates in a backward direction when the driver steps on a rear end portion of the accelerator pedal. A pedal sensor detects the swing position of the accelerator pedal and transmits the detection signal to a control device (not illustrated). The control device controls the rotating velocity of the electric motor 70 in response to the detection signal from the pedal sensor.

Furthermore, the lawn mowing vehicle 10 includes a lawn mowing device 25, which is a work machine, and a power unit (not illustrated) including a battery. The lawn mowing device (mower) 25 is supported on the lower side in the middle portion of the main frame 16 in the front-back direction. The lawn mowing device 25 includes a mower deck 26 and three lawn mowing blades 27, which are lawn-mowing rotary tools that are rotatable around an axis in the vertical direction inside the mower deck 26. The lawn mowing blade 27 is rotated to cut the grass, or the like, so as to enable mowing. Each of the lawn mowing blades 27 is driven by a mower electric motor (not illustrated).

The rotation of the lawn mowing blade 27 enables lawn mowing, and the mowed grass is discharged from inside the mower deck 26 through a duct 28 into a grass collection container (not illustrated) mounted on the rear end of the lawn mowing vehicle 10. A configuration may be such that the mowed grass is discharged from the mower deck to one side of the vehicle in the width direction.

The lawn mowing device may be configured to include, as a lawn-mowing rotary tool, a mowing reel that includes a spiral blade, for example, provided on a cylinder having a rotation axis parallel to the ground surface, has the function to pinch and cut the grass, or the like, and is driven by a mowing electric motor.

Figure 2:
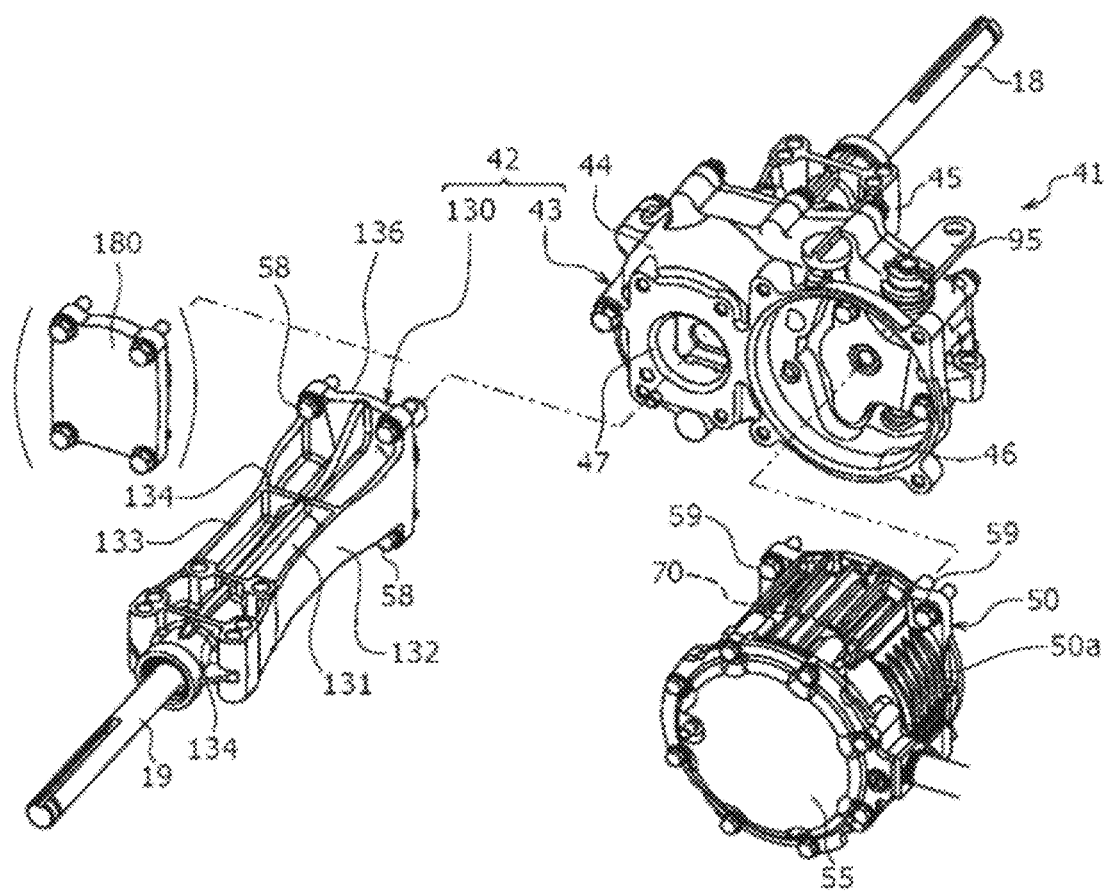
FIG. 2 is an exploded perspective view of the electric-vehicle power transmission unit according to the embodiment.
Figure 3:
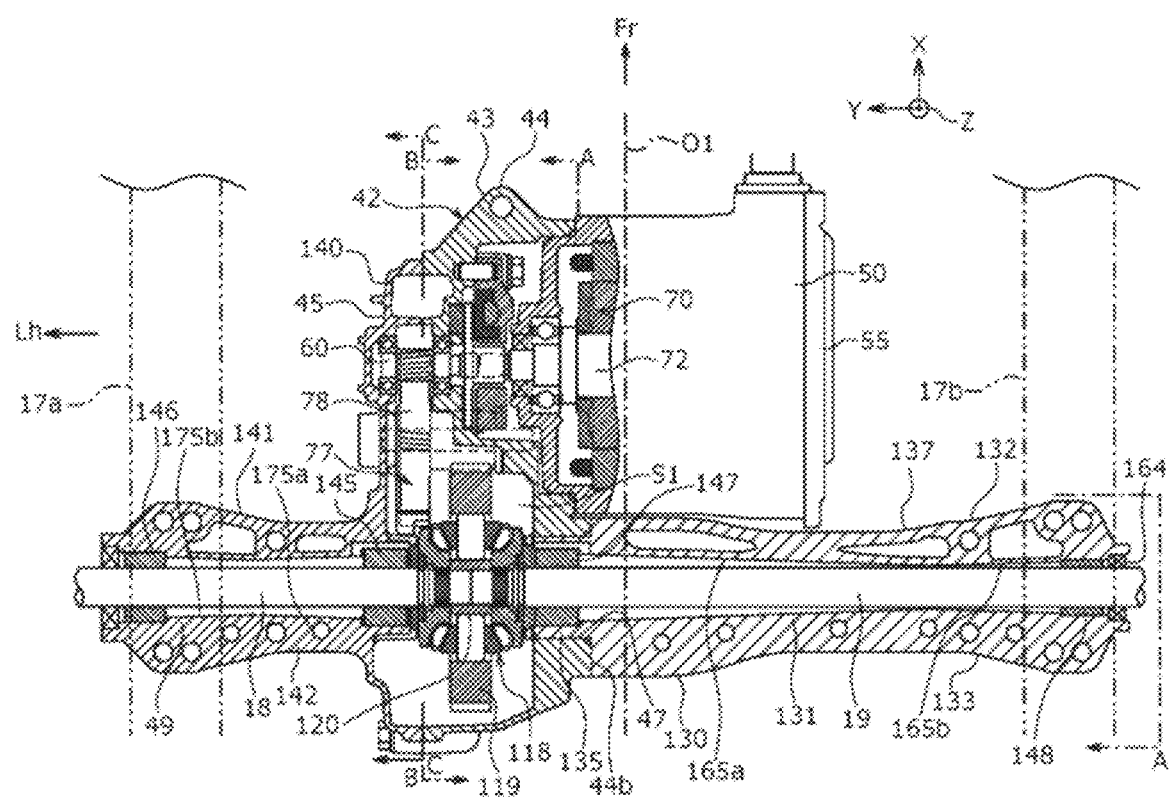
FIG. 3 is a partially cross-sectional view of the electric-vehicle power transmission unit according to the embodiment when viewed from above.
Figure 4:
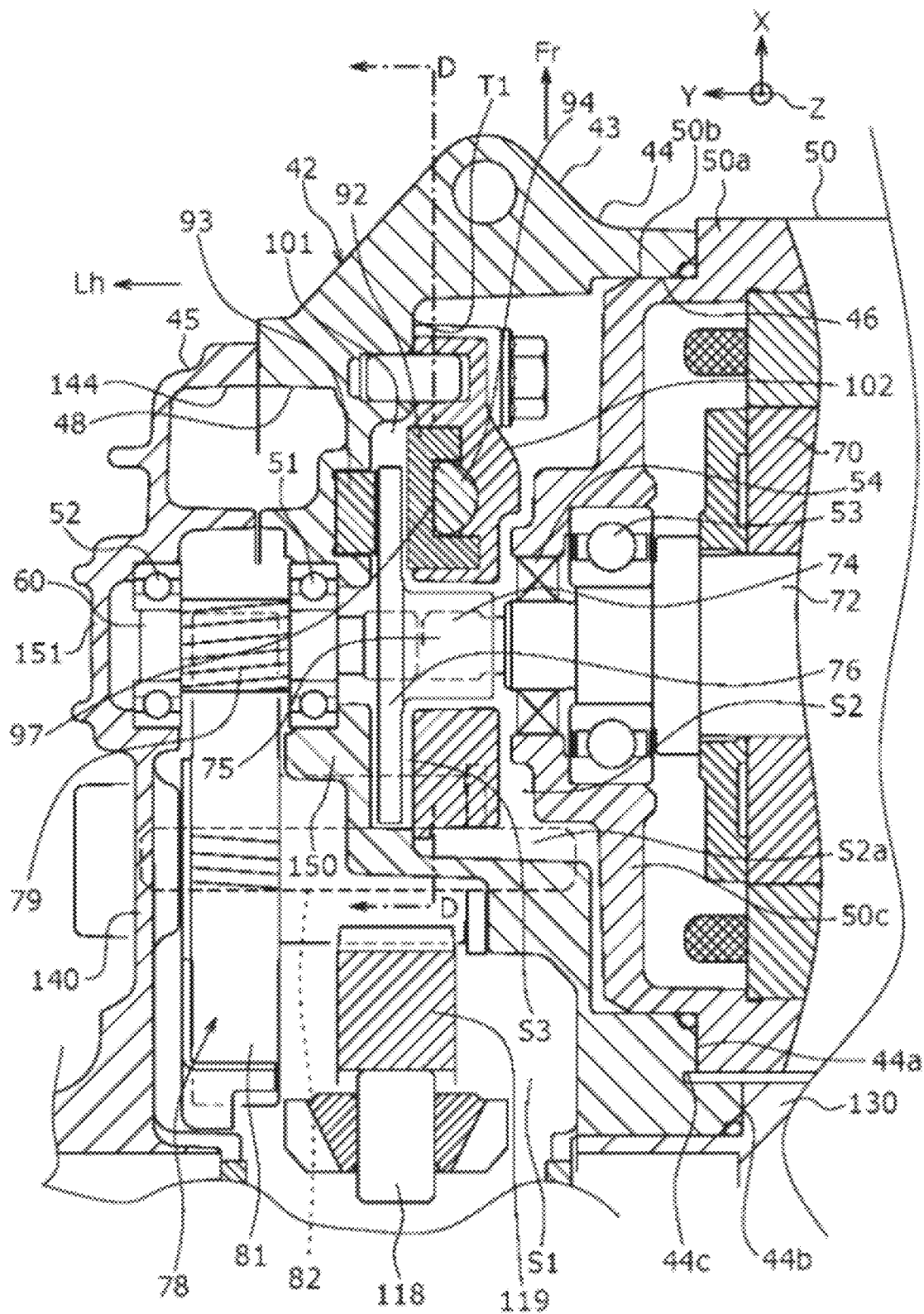
FIG. 4 is an enlarged view of a housing portion of a reduction gear mechanism inside an axle case in FIG. 3.

The above is the overall configuration of the lawn mowing vehicle 10, and next, the power transmission unit 41 mounted on the lawn mowing vehicle 10 will be described. FIG. 2 is an exploded perspective view of the power transmission unit 41. FIG. 3 is a partial cross-sectional view of the power transmission unit 41 when viewed from above. FIG. 4 is an enlarged view of a housing portion of the reduction gear mechanism 78 inside the axle case 42 in FIG. 3.

The power transmission unit 41 is formed by assembling together the axle case 42, the motor case 50 fixed to the axle case 42, the electric motor 70 for driving housed in the motor case 50, the power transmission mechanism 77 (FIG. 3) housed in the axle case 42, and the first axle 18 and the second axle 19 that are the left and right axles. The second axle 19 is longer than the first axle 18, and the motor case 50 is provided on the same side as the second axle 19 with respect to the center between the first axle 18 and the second axle 19 in the right-left direction, as described below. This allows the center of gravity of the power transmission unit 41 to be closer to a right-left direction center line O1 (FIG. 3) of the lawn mowing vehicle 10.

As illustrated in FIGS. 3 and 4, the axle case 42 houses inside an input shaft 60, the reduction gear mechanism 78, and the differential gear mechanism 118, which form the power transmission mechanism 77, and respective portions of the first axle 18 and the second axle 19. The reduction gear mechanism 78 is a mechanism that transmits the power between the input shaft 60 and a ring gear 119 provided on an outer periphery side of the differential gear mechanism 118 and that transmits the power from the input shaft 60 to the ring gear 119 at a reduced speed. The input shaft 60 is provided on the same axis as that of a motor shaft 72 of the electric motor 70 and is connected so as not to rotate relative to the motor shaft 72, i.e., so as to rotate together with the motor shaft 72.

The axle case 42 is formed as a single unit by joining a first axle case 43, which houses part of the first axle 18, the reduction gear mechanism 78, and the differential gear mechanism 118, and the second axle case 130, which houses part of the second axle 19, with a plurality of bolts 58 (FIG. 2). The first axle 18 and the second axle 19 are separated to right and left and each extend in the right-left direction. Inner end portions of the first axle 18 and the second axle 19 are rotatably fitted inside a cylindrical sleeve 120 forming the differential gear mechanism 118, and the inner ends of the first axle 18 and the second axle 19 are opposed to each other inside the sleeve 120.

Figure 5:
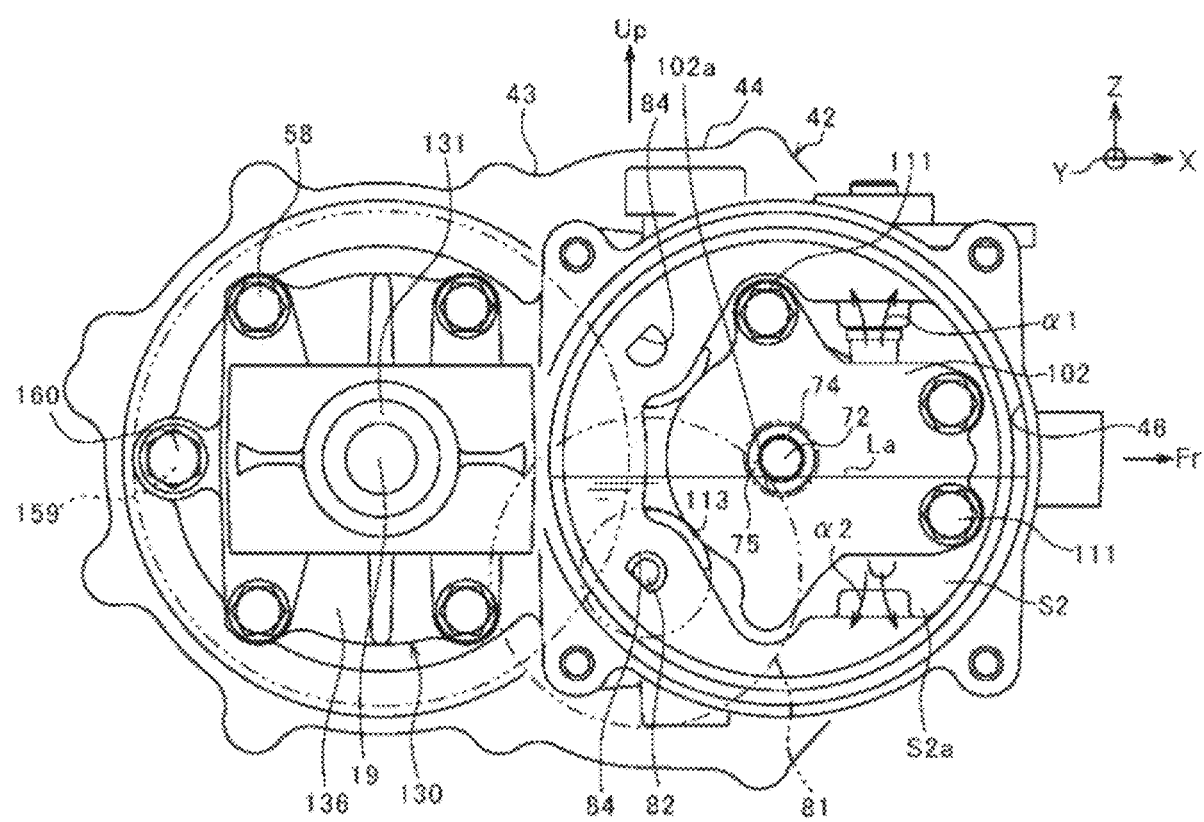
FIG. 5 is a cross-sectional view along A-A of FIG. 3.
Figure 6:
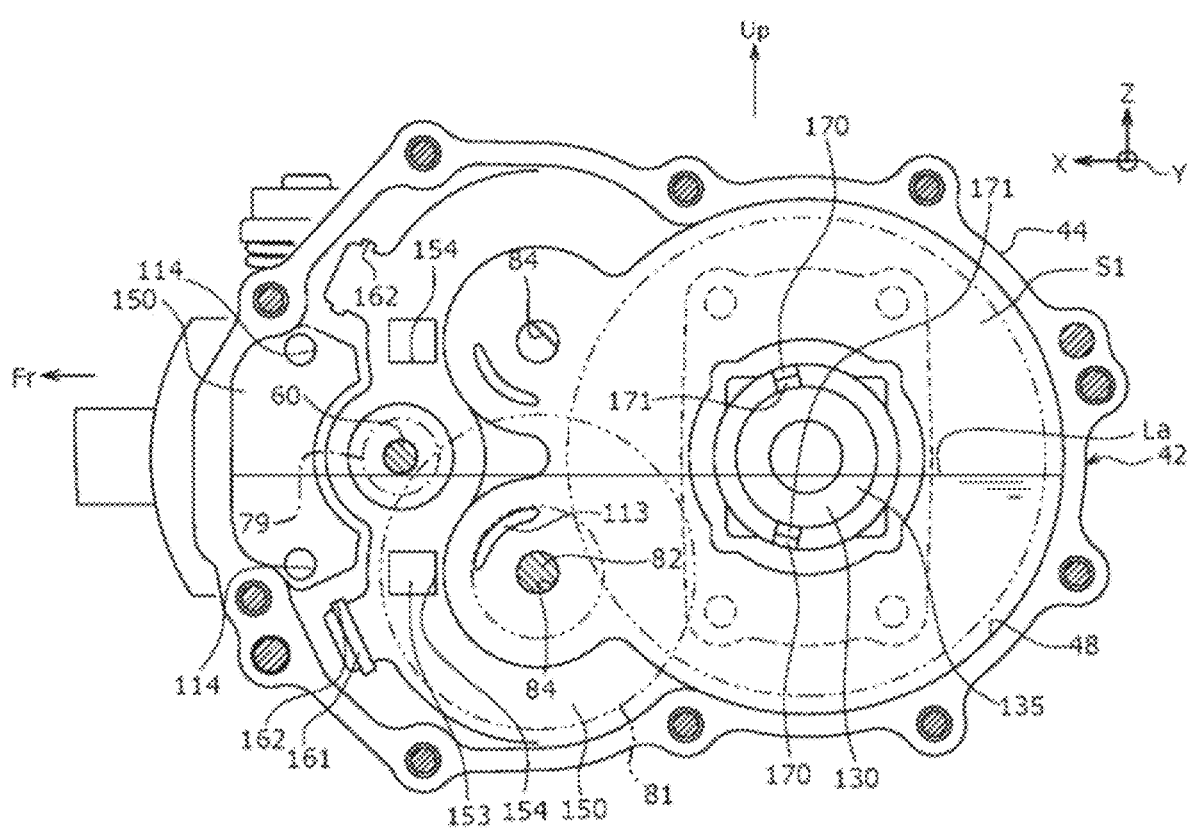
FIG. 6 is a cross-sectional view along B-B of FIG. 3.

The first axle case 43 is formed by fixing an inner case element 44 on the side of the electric motor 70 and an outer case element 45 on the opposite side of the electric motor 70 by screwing. FIG. 5 is a cross-sectional view along A-A of FIG. 3, and FIG. 6 is a cross-sectional view along B-B of FIG. 3. As illustrated in FIGS. 2 to 5, the inner case element 44 includes a front opening 46 and a rear opening 47 (FIG. 2), which are substantially circular in cross-section, respectively, on both sides in the front-back direction at the right end and, as illustrated in FIG. 6, includes an opening 48 from the front side to the rear side at the left end.

Figure 7:
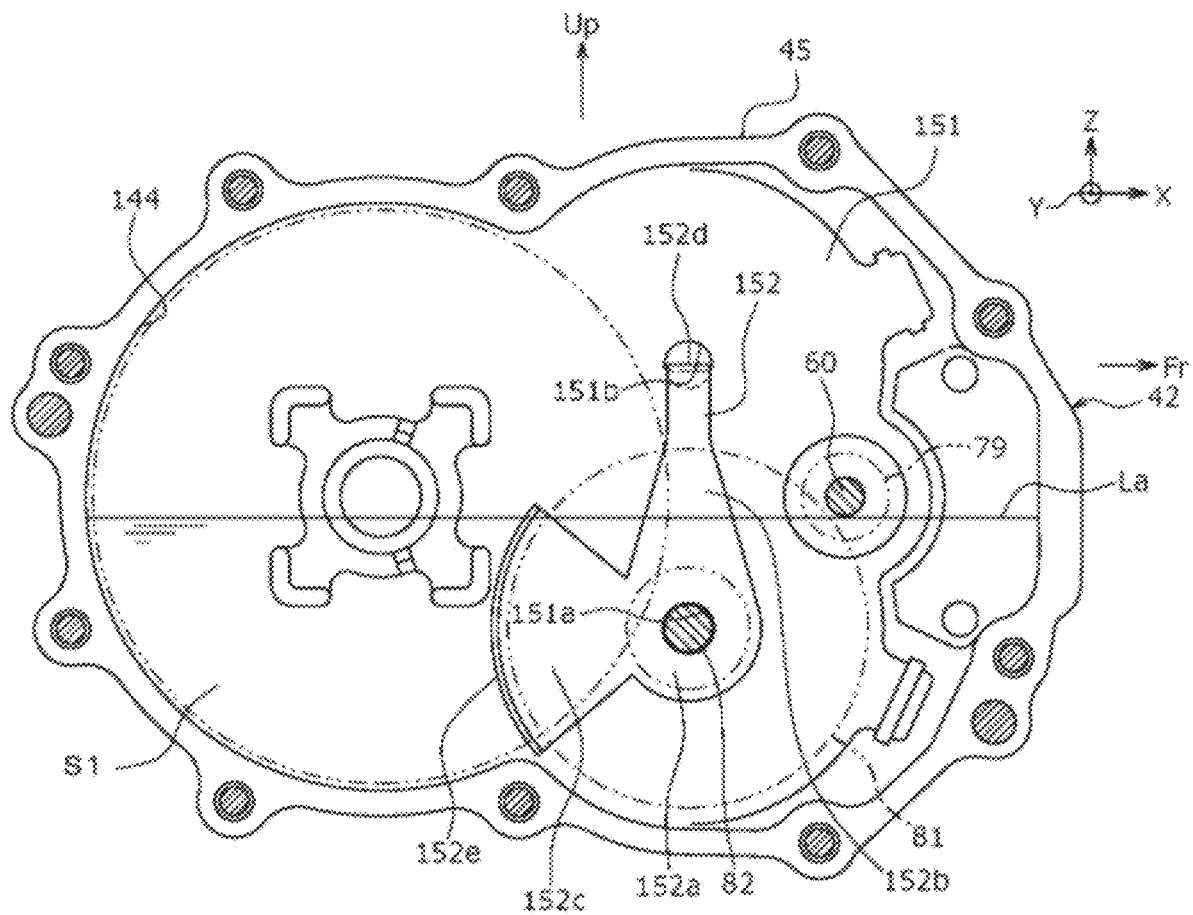
FIG. 7 is a cross-sectional view along C-C of FIG. 3.
Figure 13:
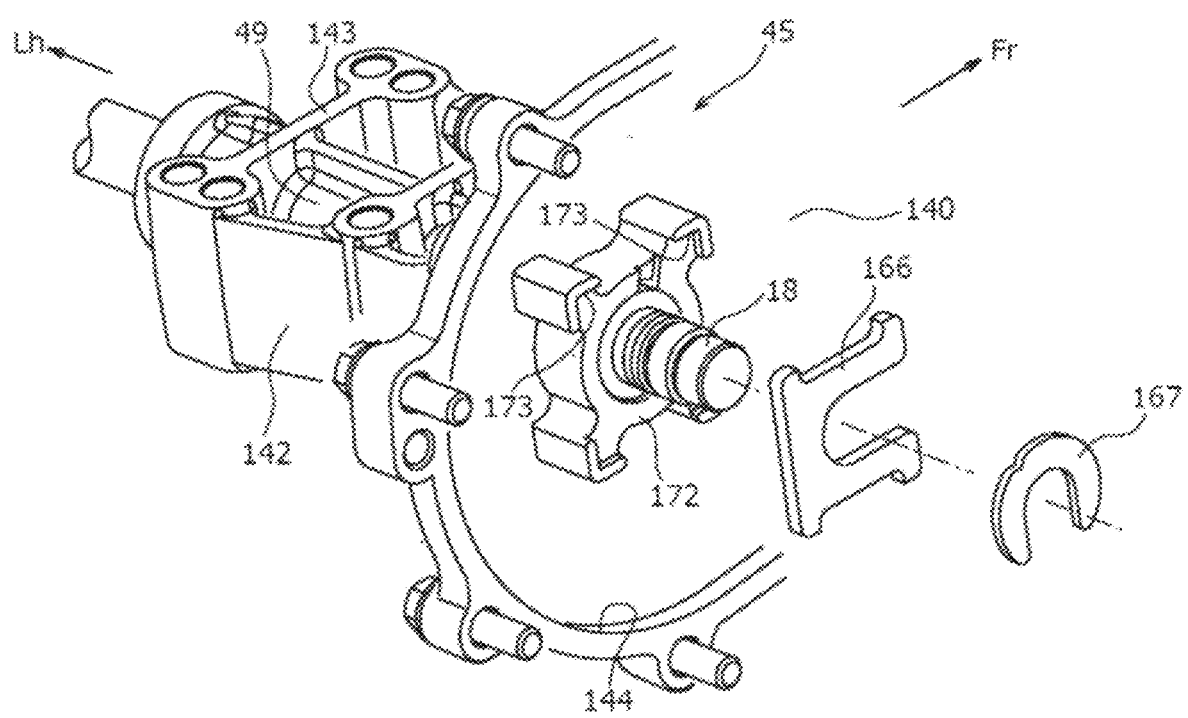
FIG. 13 is a perspective view illustrating a state immediately before a thrust washer is attached to an inner side of an outer case element of the first axle case and a retaining ring is engaged with a first axle.

FIG. 7 is a cross-sectional view along C-C of FIG. 3. As illustrated in FIGS. 3, 4, and 7, the outer case element 45 is obtained by integrally molding a cylindrical portion 49, which is an axle case portion housing the first axle 18, and a cover portion 140, which covers one side end of the reduction gear mechanism 78 in the axial direction. As illustrated in FIGS. 3 and 13 below, two wall portions 141 and 142 are joined to the outer side of the cylindrical portion 49 on both sides in the front-back direction through ribs, and a plurality of plate portions 143 extending in the front-back direction are joined to the two wall portions 141 and 142 at a plurality of positions in the right-left direction to reinforce the cylindrical portion 49.

The outer case element 45 includes an opening 144 from the front side to the rear side on the right side of the vehicle. The cylindrical portion 49 extends in a cylindrical shape from a rear position to the left on the left side that is the outer side of the outer case element 45 in the vehicle width direction. The first axle 18 passes through the cylindrical portion 49 and is rotatably supported by bushings 145 and 146, which are sliding bearings provided at two positions in the axial direction on the inner side.

The inner case element 44 and the outer case element 45 are joined together such that the outer edge portions of the end portions in the right-left direction are butted together, so that the opening 48 at the left end of the inner case element 44 is closed by the outer case element 45. Accordingly, inside the first axle case 43, a gear chamber S1 is formed, in which each gear of the reduction gear mechanism 78 and the differential gear mechanism 118 is provided. Meanwhile, the front opening 46 at the right end of the first axle case 43 is closed by the motor case 50 described below. The outer case element 45 and the inner case element 44 are made of a metallic material such as aluminum alloy and are formed by die-casting, which is one type of casting. The inner case element 44 may be machined after molding by die-casting to increase the flatness of, for example, a first fixing surface 44a (FIG. 4), to which an end surface of the motor case 50 described below is butted and fixed, and a second fixing surface 44b (FIG. 4), to which an end surface of the second axle case 130 is butted and fixed. A recessed groove 44c (FIG. 4) is formed along the vertical direction between the first fixing surface 44a and the second fixing surface 44b to prevent the first fixing surface 44a and the second fixing surface 44b from being directly connected.

As described below in detail, the reduction gear mechanism 78 includes a first helical gear 79, which is an input gear provided on the input shaft 60, and an intermediate gear shaft 82 provided with a second helical gear 81, which is an intermediate gear that is meshed with the first helical gear 79. Furthermore, an intermediate gear portion 83 (FIG. 10) provided on the intermediate gear shaft 82 is meshed with the ring gear 119 provided on the outer periphery side of the differential gear mechanism 118 described below.

The second axle case 130 is fitted inside the rear opening 47 at the right end of the first axle case 43, and the end surface of the second axle case 130 is butted against the second fixing surface 44b in the edge portion of the rear opening 47 on the right side surface of the first axle case 43.

Figure 12:
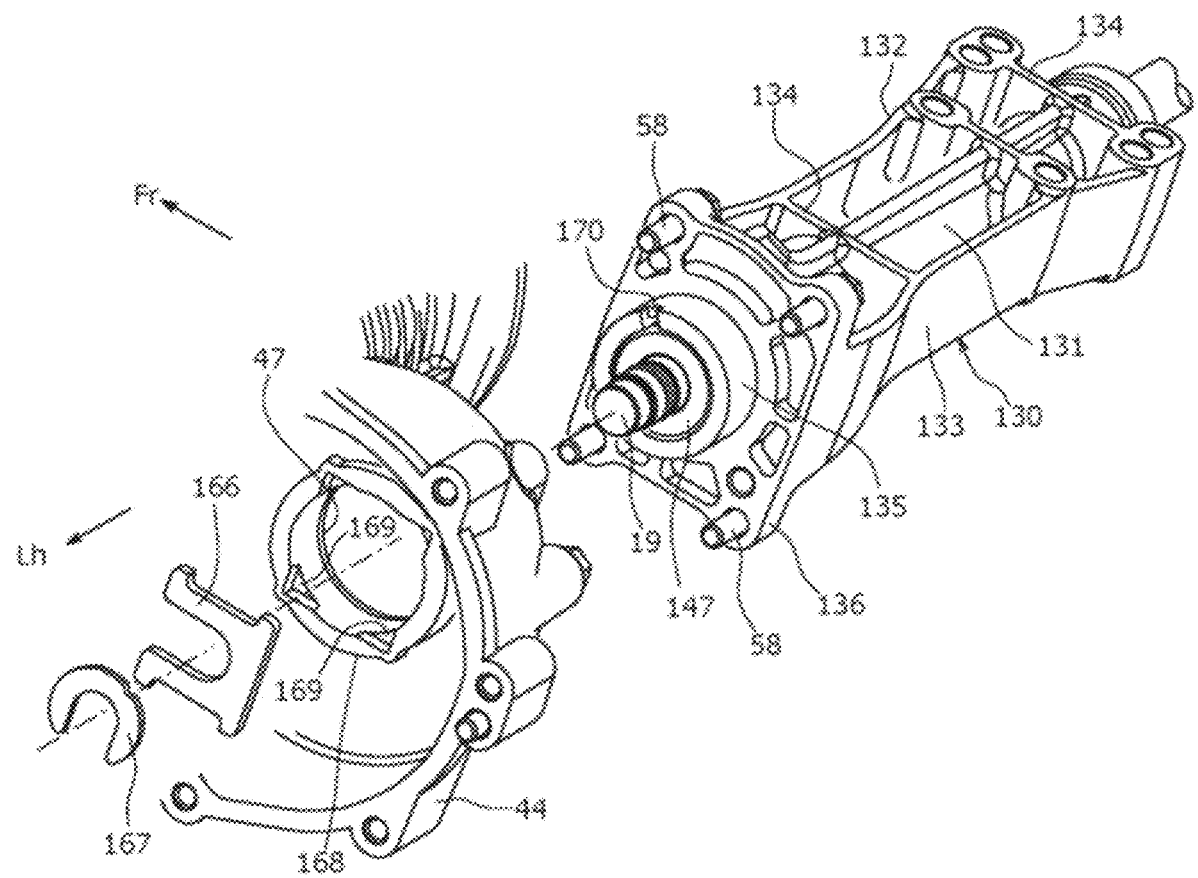
FIG. 12 is a perspective view illustrating a state immediately before a second axle case is attached to an inner case element of a first axle case.

As illustrated in FIGS. 2, 3, and 12 below, the second axle case 130 includes a cylindrical portion 131 having a cylindrical shape and two wall portions 132 and 133 joined through ribs to the outer side of the cylindrical portion 131 on both sides in the front-back direction. Furthermore, a plurality of plate portions 134 extending in the front-back direction are joined to the two wall portions 132 and 133 at a plurality of positions in the right-left direction to reinforce the cylindrical portion 131. In the left end portion of the second axle case 130, a circular cylindrical portion 135 is formed to be fitted inside the rear opening 47 of the first axle case 43. The second axle 19 passes through the inside of the cylindrical portion 131 of the second axle case 130 and is rotatably supported by bushings 147 and 148 provided at two positions in the axial direction.

The second axle case 130 is made of a metal such as aluminum alloy and is formed by die-casting. In this state, as illustrated in FIGS. 2 and 5, a flange 136 having substantially a rectangular shape and having a length in the vertical direction longer than that in the front-back direction is formed on the inner end portion that is the left end portion of the second axle case 130. The second axle case 130 is fixed to the first axle case 43 with the plurality of bolts 58 passing through the flange 136. This forms the axle case 42. The second axle case 130 may be machined to increase the flatness of a fixing surface that is butted and fixed to the second fixing surface 44b of the inner case element 44.

A recessed portion 137, which is recessed toward the cylindrical portion 131, is formed in a middle portion of each of the wall portions 132 and 133 of the second axle case 130 in the right-left direction. The cross-sectional shape of each of the recessed portions 137 perpendicular to the vertical direction is substantially identical over the entire length in the vertical direction. Thus, the recessed portion 137 is formed in a portion of the second axle case 130 opposed to the motor case 50. In the assembled state of the motor case 50 to the first axle case 43, part of the motor case 50 enters the recessed portion 137.

Furthermore, the second axle case 130 is fixed to the first axle case 43 in a separable manner. An outer end portion of the cylindrical portion 49 of the first axle case 43 and an outer end portion of the second axle case 130 are fixed to fixing members 17a and 17b, which constitute the main frame 16 of the vehicle. The cylindrical portion 49 of the first axle case 43 and the second axle case 130 may be directly fixed to the main frame 16. The outer end portion of the first axle 18 in the vehicle width direction protrudes from the end of the cylindrical portion 49 of the outer case element 45, and a hub for fixing the left wheel is fixed to the protruding portion. On the other hand, the outer end portion of the second axle 19 in the vehicle width direction protrudes from the end of the second axle case 130, and a hub for fixing the right wheel is fixed to the protruding portion.

Figure 11:
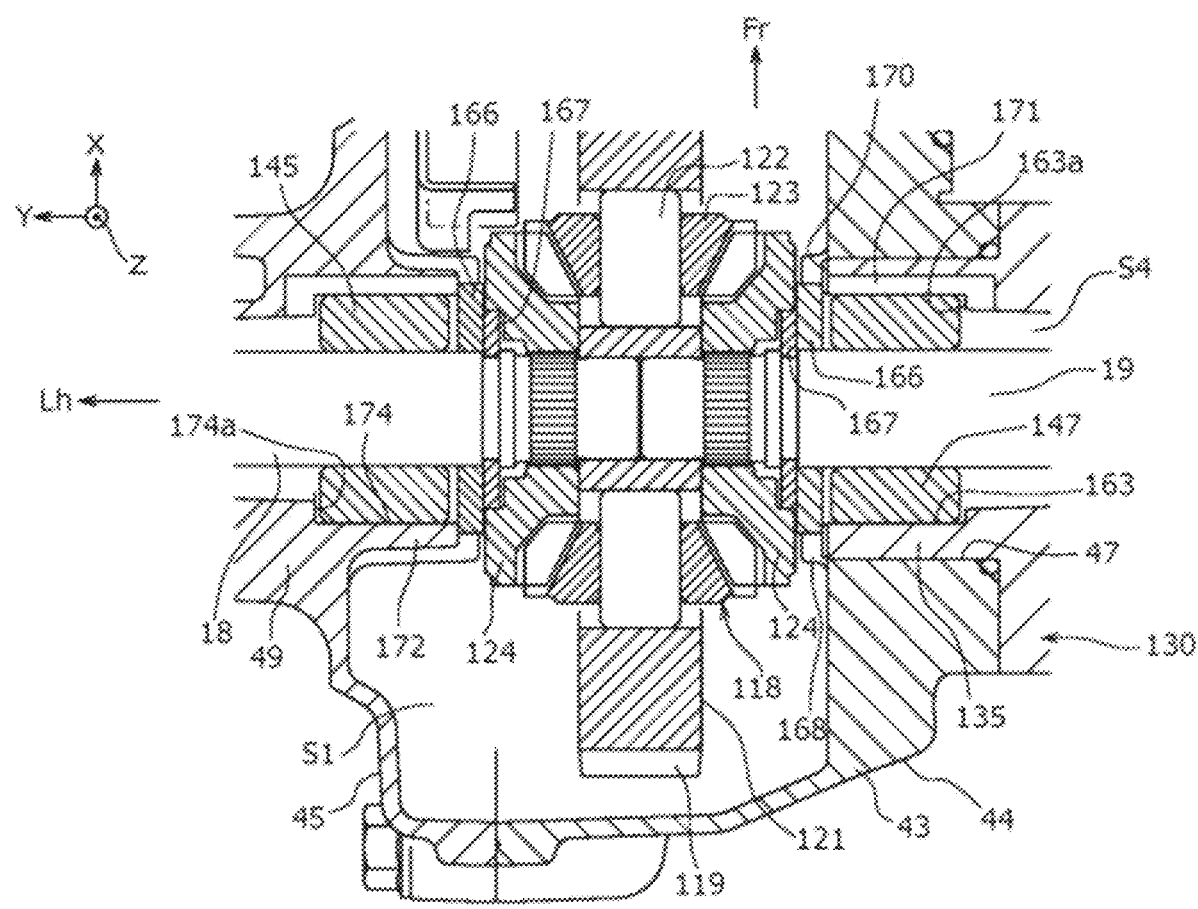
FIG. 11 is an enlarged cross-sectional view of a differential gear mechanism in FIG. 3 and its vicinity.
Figure 15:
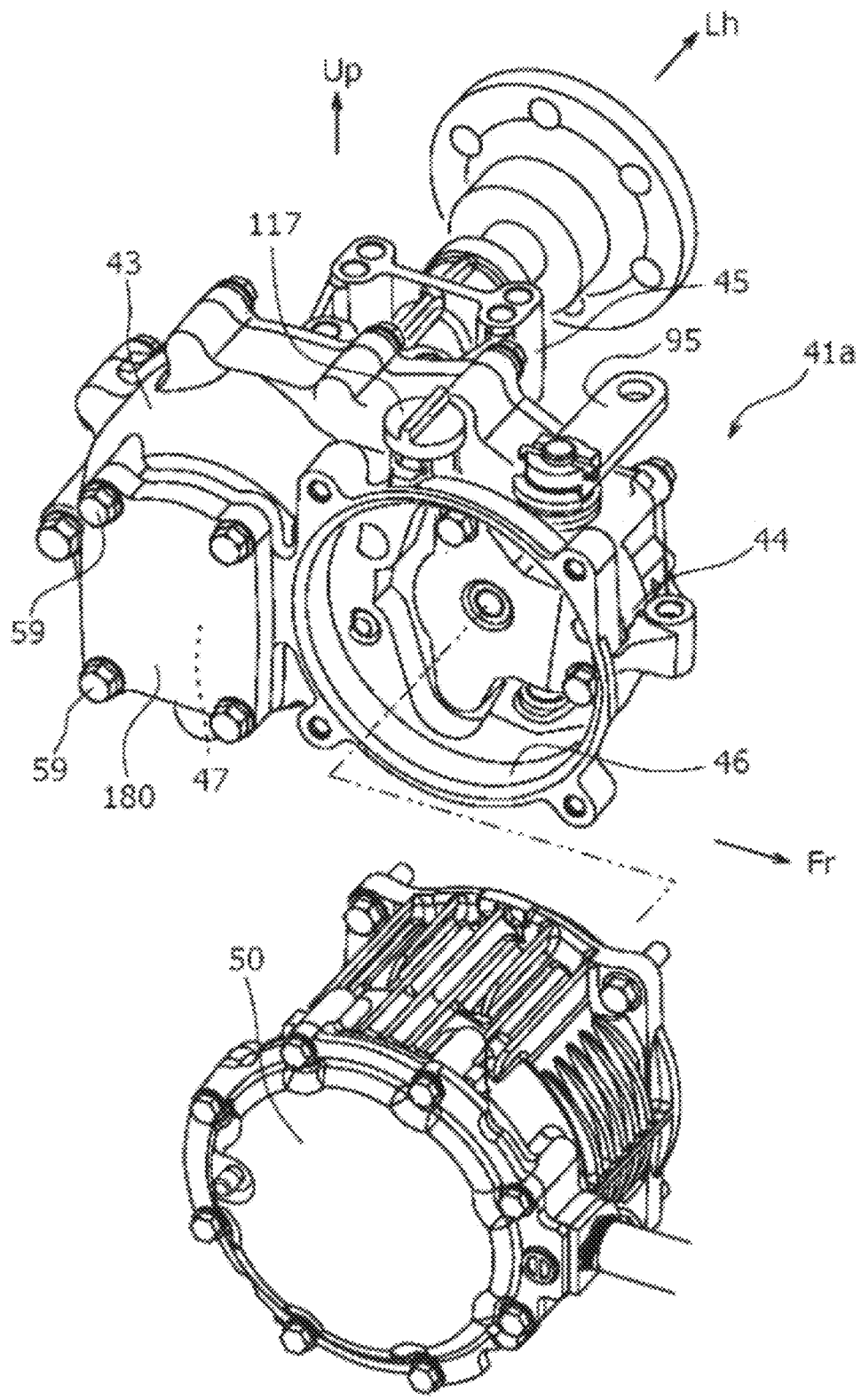
FIG. 15 is a partially exploded perspective view illustrating formation of a power transmission unit for a left wheel of another vehicle by using a part of components forming the power transmission unit in FIG. 2.
Figure 16:
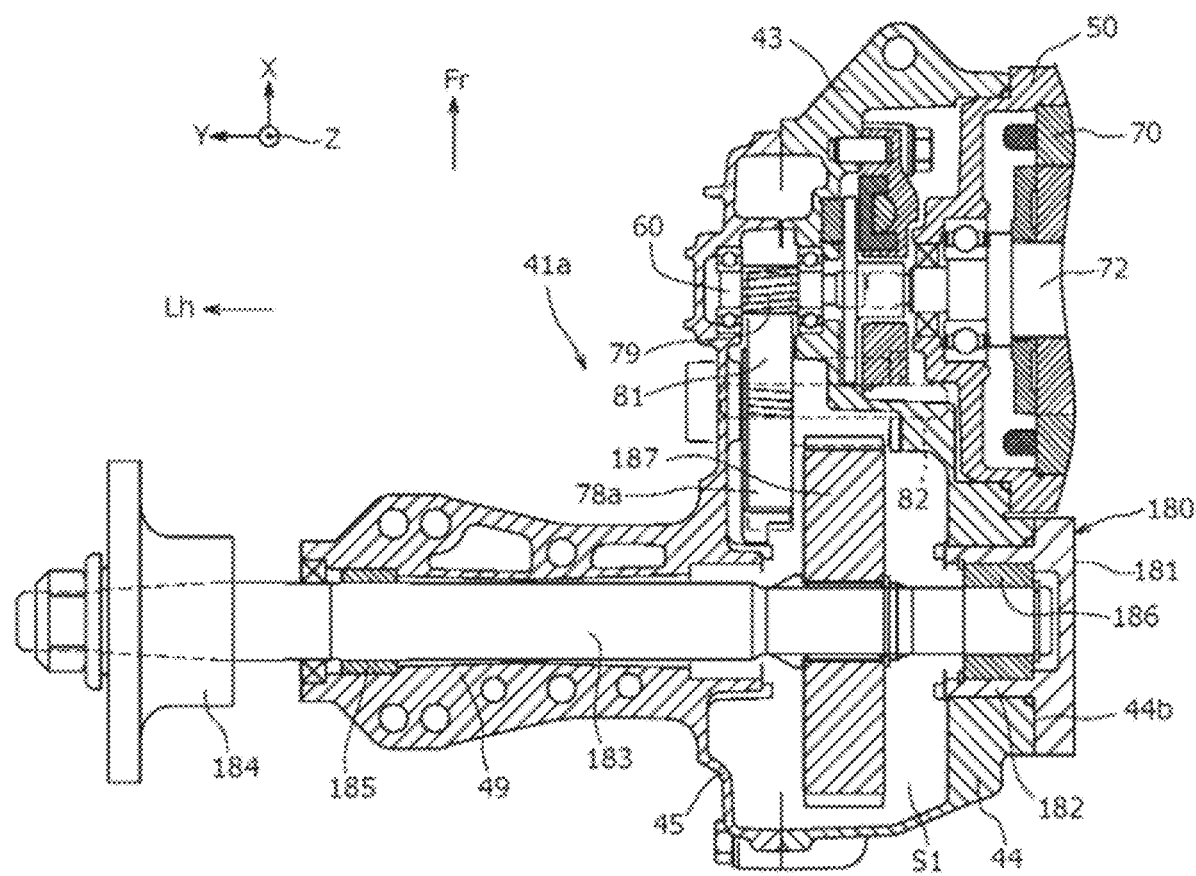
FIG. 16 is a cross-sectional view of a power transmission unit for a left wheel illustrated in FIG. 15.
Figure 17:
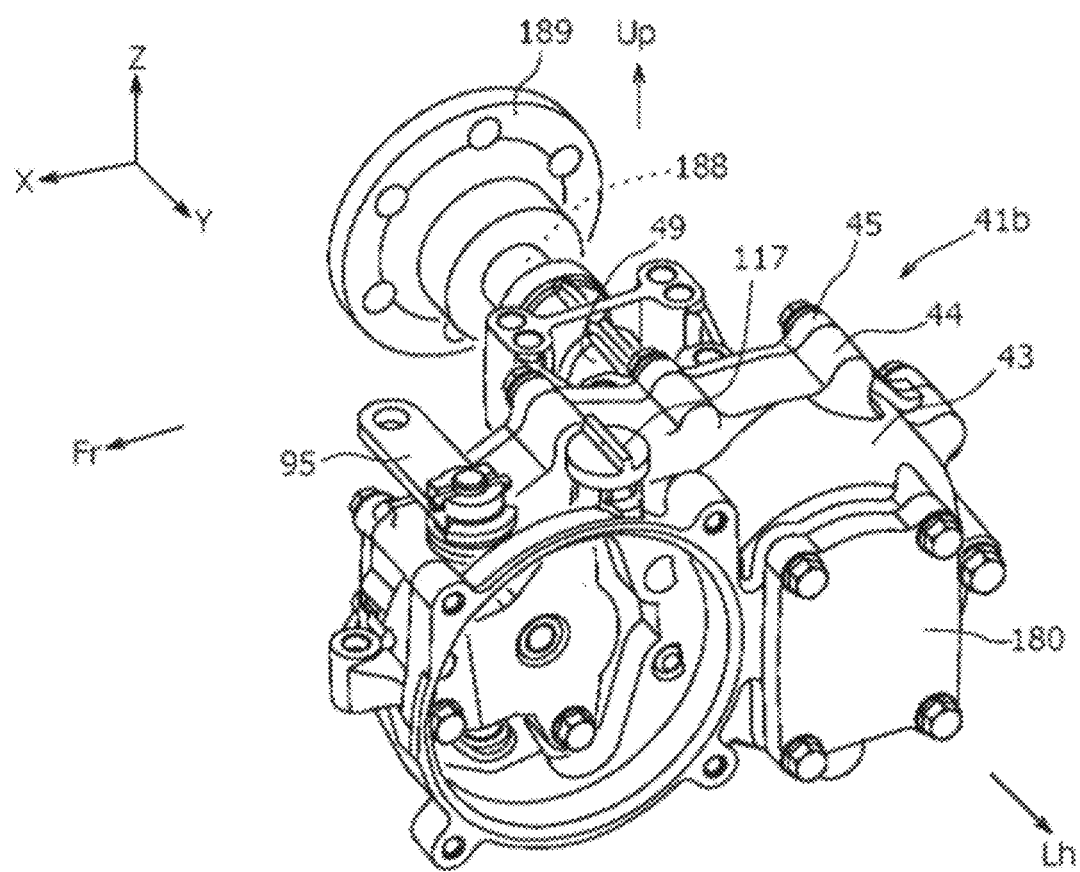
FIG. 17 is a partially omitted perspective view illustrating formation of a power transmission unit for a right wheel of another vehicle by using a part of the components forming the power transmission unit in FIG. 2.

As illustrated in FIG. 11 below, the differential gear mechanism 118 includes a differential case 121 supported in the first axle case 43 so as to be located on the same axis as that of each of the first axle 18 and the second axle 19, the ring gear 119 that is fixed to the outer peripheral surface of the differential case 121 and is meshed with the intermediate gear portion 83 of the reduction gear mechanism 78, a pinion shaft 122 that is arranged perpendicular to the first axle 18 and the second axle 19 in the differential case 121 and rotates integrally with the differential case 121, a pinion 123 that is a bevel gear rotatably supported by the pinion shaft 122, and a side bevel gear 124 that is fixed to the inner end portion of each of the first axle 18 and the second axle 19 and is meshed with the pinion 123. Accordingly, the first axle 18 and the second axle 19 are differentially connected. The power of the electric motor 70 is transmitted from the motor shaft 72 to the input shaft 60, reduced by the reduction gear mechanism 78, and then differentially transmitted to the first axle 18 and the second axle 19 by the differential gear mechanism 118. Thus, the first axle 18 and the second axle 19 are differentially driven. In FIG. 2, a cover member 180 is illustrated in brackets. As described below, the cover member 180 is assembled to the first axle case 43 instead of the second axle 19 and the second axle case 130 to thus form power transmission units 41a and 41b for the left wheel and the right wheel of the vehicle according to another example as illustrated in FIGS. 15 to 17 below.

Figure 8:
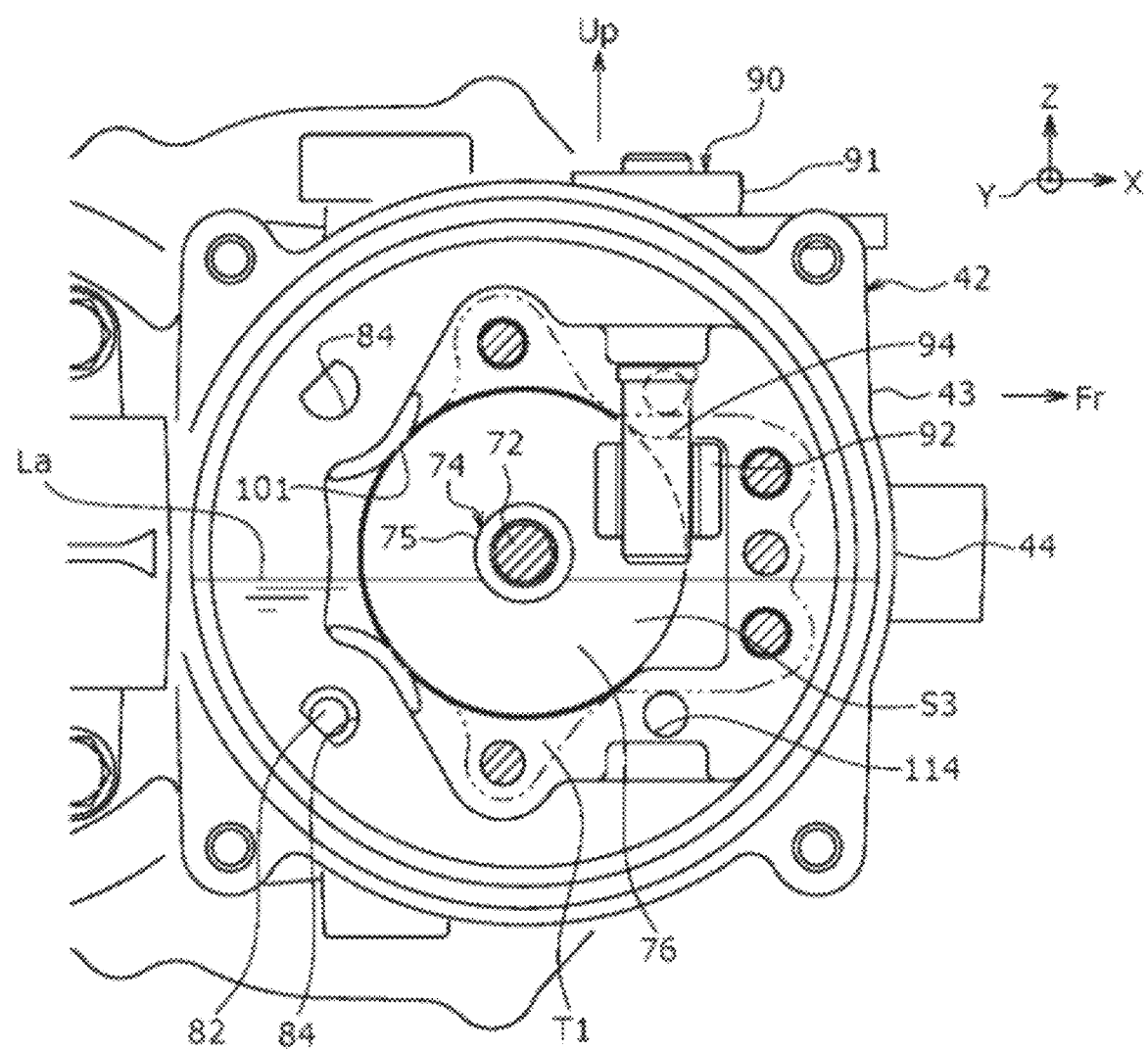
FIG. 8 is an enlarged view of a front half portion of FIG. 6 with a brake holder omitted from a first axle case.
Figure 9:
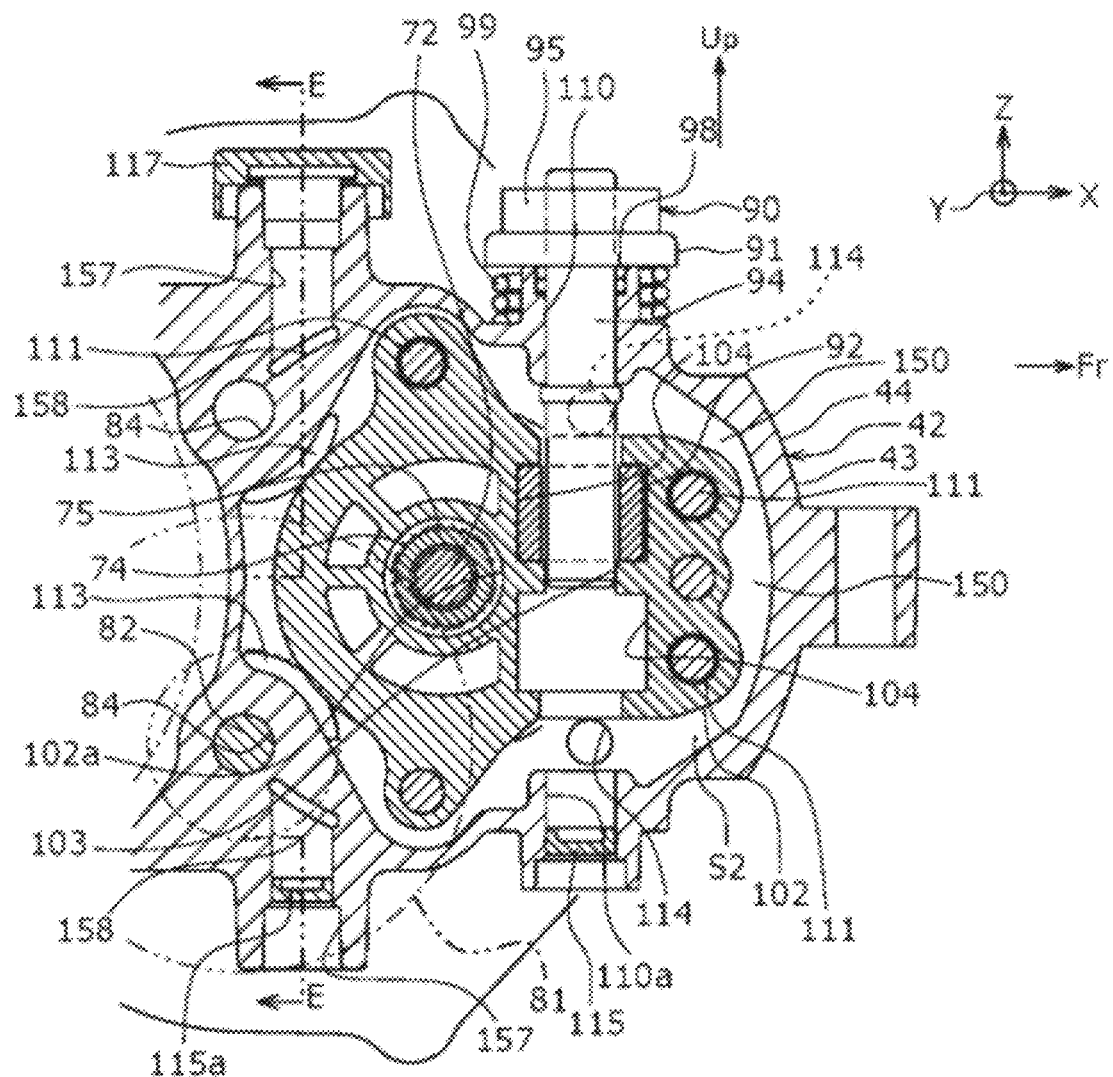
FIG. 9 is a cross-sectional view along D-D of FIG. 4.

FIG. 8 is an enlarged view of a front half portion of FIG. 6 with a brake holder omitted from the first axle case 43. FIG. 9 is a cross-sectional view along D-D of FIG. 4. As illustrated in FIGS. 4, 8, and 9, a brake rotor 76 and a brake holder 102 are provided inside the first axle case 43, and a brake chamber S2 is formed, which includes one end of the input shaft 60 and one end of the motor shaft 72 opposed to the end and includes the position where both the input shaft 60 and the motor shaft 72 are opposed to each other. The input shaft 60 is rotatably supported in the first axle case 43 by two bearings 51 and 52. Of the two bearings 51 and 52, the bearing 51 is held by a partition wall 150 extending from a perimeter wall of the inner case element 44 inward into the case, and the bearing 52 is held by an inner surface of a standing wall 151 of the outer case element 45.

The input shaft 60, the reduction gear mechanism 78, and the differential gear mechanism 118 are provided in the gear chamber S1 provided in the first axle case 43. The inside of the first axle case 43 is filled with an appropriate amount of oil to form an oil surface at the boundary with an air layer.

The gear chamber S1 and the brake chamber S2 allow fluidic communication of oil with each other as described below, and the oil is contained in lower portions of the gear chamber S1 and the brake chamber S2. This achieves smoothness of the reduction gear mechanism 78 and the differential gear mechanism 118 in the gear chamber S1 and cooling of the brake rotor 76 (described below) in the brake chamber S2. In FIGS. 5 to 8 and 10 described below, the oil surface is indicated by a solid line La. Air layers are formed in the respective upper portions of the gear chamber S1 and the brake chamber S2.

Furthermore, the motor shaft 72 of the electric motor 70 is connected to one end portion, which is the inner end portion in the vehicle width direction, of the input shaft 60 with a connection member 74 as a joint. Thus, the power of the electric motor 70 is transmitted from the motor shaft 72 to the input shaft 60.

The motor case 50 houses the electric motor 70 inside and is connected and fixed to the inner case element 44 of the axle case 42 with the bolt 59 (FIG. 2) to close the front opening 46 of the axle case 42 and extend to the right side. Accordingly, the motor case 50 is provided on the same side as the second axle 19 with respect to the center between the first axle 18 and the second axle 19 in the right-left direction. As illustrated in FIG. 3, part of the motor case 50, i.e., the rearward protruding portion of the right end portion, enters the recessed portion 137 formed in the wall portion 132 of the second axle case 130 on the electric motor 70 side. This allows the electric motor 70 and the second axle 19 to be closer, as described below, and thus a reduction in the size of the power transmission unit 41 may be further achieved.

A right opening of a case main body 50a, which has a cylindrical shape with a bottom, is closed by a cover 55 so that the motor case 50 is formed. A bottom portion of the case main body 50a includes a fitting cylindrical portion 50b protruding in the axial direction from an inner peripheral portion of an inner end surface of a main body cylindrical portion, and a stepped cylindrical cover portion 50c that closes an inner end opening of the fitting cylindrical portion 50b, and the motor shaft 72 of the electric motor 70 passes through the inside of a small-diameter cylindrical portion formed in a central portion of the cover portion 50c. The fitting cylindrical portion 50b is fitted into the front opening 46 of the inner case element 44. A bearing 53 and a seal 54 to seal the oil inside the axle case 42 from entering the motor case 50 are fixed to the inner peripheral surface of the small-diameter cylindrical portion. The motor shaft 72 is rotatably supported by the bearing 53 inside the small-diameter cylindrical portion. Accordingly, the motor shaft 72 of the electric motor 70 extends in the right-left direction parallel to the extending direction of the first axle 18 and the second axle 19. The motor shaft 72 is provided at a different position in the front-back direction, which is a first direction perpendicular to the right-left direction, and at the identical position in the vertical direction, which is a second direction perpendicular to the right-left direction and the front-back direction. Furthermore, as illustrated in FIGS. 5 to 9, the intermediate gear shaft 82 of the reduction gear mechanism 78 is provided at a different position with respect to the first axle 18, the second axle 19, and the motor shaft 72 in the vertical direction. Specifically, the intermediate gear shaft 82 is provided on the lower side with respect to the first axle 18, the second axle 19, and the motor shaft 72. This may achieve a reduction in the size of the power transmission unit 41 even when the intermediate gear shaft 82, which includes the second helical gear 81 that is an intermediate gear, is provided between the first helical gear 79, which is an input gear of the reduction gear mechanism 78, and the differential gear mechanism 118.

As illustrated in FIG. 3, the electric motor 70 is, for example, a three-phase permanent magnet motor. The electric motor 70 includes a motor rotor fixed to an outer peripheral surface of the motor shaft 72, a stator core opposed to an outer peripheral surface of the motor rotor, and a three-phase stator coil wound around the stator core. The motor rotor includes permanent magnets provided at a plurality of positions in a circumferential direction on the rotor core.

The stator core is fixed to the inner side of the motor case 50. The right end portion of the motor shaft 72 is rotatably supported by a bearing (not illustrated) in the motor case 50. When three-phase alternating-current power is supplied to the stator coil from the battery, the motor shaft 72 rotates due to the interaction between a rotating magnetic field generated in the stator core and a magnetic field generated by the motor rotor.

The motor shaft 72 is located on the same axis as that of the input shaft 60 of the reduction gear mechanism 78, and the respective end surfaces are connected with the connection member 74 with a gap therebetween. Specifically, male splines are formed on the outer peripheral surface of one end portion of the motor shaft 72 and the outer peripheral surface of one end portion of the input shaft 60 opposed to the end portion. Both axial sides of a cylindrical portion 75 of the connection member 74 are engaged with the outer side of one end portion of the motor shaft 72 and the outer side of one end portion of the input shaft 60. A female spline is formed on the inner periphery of the cylindrical portion 75 along a shaft length direction and is meshed with the male splines on the outer peripheral surface of one end portion of the motor shaft 72 and the outer peripheral surface of one end portion of the input shaft 60. Accordingly, the motor shaft 72 and the input shaft 60 are configured not to be rotatable relative to each other, i.e., to rotate together, and the connection member 74 and the input shaft 60 are configured to enable relative movement in the axial direction with respective to the motor shaft 72. Connecting the motor shaft 72 and the input shaft 60 to the cylindrical portion 75 may also be achieved by using a key instead of the splines described above.

Furthermore, the brake rotor 76 is integrally formed on the outer periphery side of one end portion of the cylindrical portion 75 of the connection member 74. Thus, it is possible to prevent an increase in the size of the power transmission unit 41 in the configuration where the brake rotor 76 is provided around the input shaft 60.

The reduction gear mechanism 78 includes the first helical gear 79 directly formed on the input shaft 60 to be provided on the input shaft 60 and the intermediate gear shaft 82 having the second helical gear 81 engaged with the outer periphery side thereof.

Figure 10:
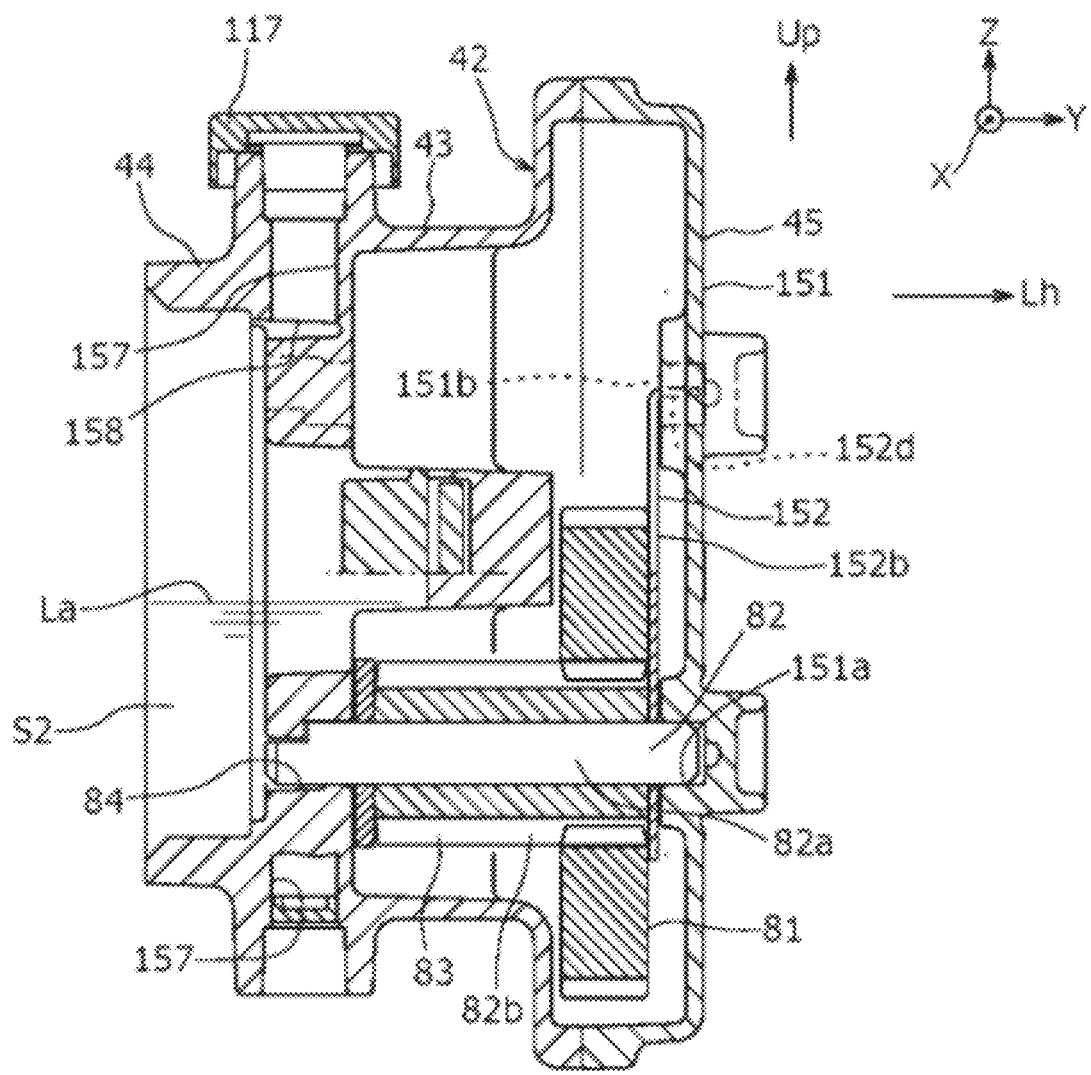
FIG. 10 is a cross-sectional view along E-E of FIG. 9.

As illustrated in FIG. 10, the intermediate gear shaft 82 includes an inner shaft 82a fixed to the axle case 42 and an outer shaft 82b engaged with the outer periphery of the inner shaft 82a, and the outer shaft 82b is supported so as to rotate relative to the inner shaft 82a. The intermediate gear portion 83, which is a spur gear having a wide width in the axial direction, is formed on the outer peripheral surface of the outer shaft 82b, and the ring gear 119 (FIG. 11) is meshed with a teeth portion on one side, the right side, of the intermediate gear portion 83. A teeth portion on the other side, the left side, of the intermediate gear portion 83 is meshed with internal teeth formed on the inner peripheral surface of the second helical gear 81, and its engagement disables the relative rotation therebetween.

No protrusions or retaining rings are provided on the outer peripheral portion of the intermediate gear portion 83 so that the second helical gear 81 may be displaced relative to the intermediate gear portion 83 in the axial direction, and instead, a pair of thrust receiving members 152 and 153 (FIG. 6) restricts the relative displacement of the second helical gear 81 in the axial direction. FIG. 10 illustrates only the thrust receiving member 152, which is one of the pair of thrust receiving members 152 and 153. Each of the thrust receiving members 152 and 153 has higher hardness than the inner case element 44 and the outer case element 45. This prevents the second helical gear 81 from making direct sliding contact with the inner case element 44 and the outer case element 45, as described below, and may prevent the member making sliding contact with the second helical gear 81 from being scraped by the second helical gear 81. The intermediate gear portion 83 is formed by sintering, which may achieve mass production at low costs, and as the outer peripheral portion does not include the stepped portion as described above, it is possible to uniform density distribution of the sintered material and maintain manufacturing qualities such as hardness and strength.

The second helical gear 81 is meshed with the first helical gear 79 to form a helical gear mechanism. The number of teeth of the ring gear 119 is larger than the number of teeth of the intermediate gear portion 83, and the number of teeth of the second helical gear 81 is larger than the number of teeth of the first helical gear 79. Accordingly, the rotation of the input shaft 60 is reduced in two stages by the reduction gear mechanism 78 and is transmitted to the ring gear 119 as an output gear.

A left end portion that is one end portion of the inner shaft 82a of the intermediate gear shaft 82 is engaged with a recessed portion 151a formed in the standing wall 151 of the outer case element 45. A right end portion that is the other end portion of the inner shaft 82a is inserted in a non-rotatable manner into a through-hole 84 formed in the wall of the inner case element 44. A right end of the inner shaft 82a is machined to form a flat portion on the outer peripheral surface thereof and is engaged with a flat portion of the through-hole 84 so that the inner shaft 82a is not rotatable.

The first helical gear 79 provided on the input shaft 60 is sandwiched between inner rings of the two bearings 51 and 52 on both sides, and when the first helical gear 79 is driven to rotate, displacement (thrust force) of the input shaft 60 in the axial direction occurs, which corresponds to the looseness inherent in the bearings 51 and 52. However, the displacement in the axial direction is absorbed by the relative sliding at the spline engagement area in the connection member 74 described above and is not transmitted to the motor shaft 72. Therefore, the motor shaft 72 and the motor rotor are not moved in the axial direction, there is no possibility of detection failure by various detection sensors (not illustrated) mounted on the motor shaft 72 and the motor rotor, and the desirable accuracy of the electric motor during driving may be maintained.

Furthermore, the second helical gear 81 is configured to enable relative displacement in the axial direction with respect to the intermediate gear shaft 82. In the helical gear mechanism, the engagement between the first helical gear 79 and the second helical gear 81 applies a thrust force in the axial direction when the first helical gear 79 and the second helical gear 81 are driven to rotate. Accordingly, only the second helical gear 81 moves in the axial direction, and the moving direction changes in accordance with the rotation direction of the first helical gear 79, i.e., the rotation direction of the motor shaft 72. The second helical gear 81 is made of a material having high hardness, such as iron or steel. On the other hand, the inner case element 44 and the outer case element 45 are made of aluminum or aluminum alloy to reduce weight, or the like, and has hardness lower than that of the second helical gear 81. Therefore, when the second helical gear 81 moves in the axial direction, comes into contact with the axle case 42, and causes friction, the axle case 42 may be scraped.

According to the embodiment, to prevent such an inconvenience, the pair of thrust receiving members 152 and 153 (FIGS. 6, 7, and 10) is provided in the case portions opposed to one end surface and the other end surface of the second helical gear 81 in the axial direction in the axle case 42. The pair of thrust receiving members 152 and 153 are each supported so as not to rotate relative to the axle case 42.

Specifically, as illustrated in FIG. 7, the one thrust receiving member 152 on the outer case element 45 side includes a main body portion 152a having a shape like a disk plate, a first arm 152b that is formed integrally with the main body portion 152a and extends upward, and a second arm 152c that is integrally formed with the main body portion 152a and has a shape like a fan extending wider toward the rear side. A through-hole formed in the main body portion 152a is engaged with one end portion of the intermediate gear shaft 82 and is interposed between the outer case element 45 and the second helical gear 81. The first arm 152b has a width narrower from the main body portion 152a side toward a middle portion and has a constant width from the middle portion toward an end portion. An end portion that is the outer end of the first arm 152b in the extending direction is bent at substantially a right angle toward the outer case element 45 to form a bend portion 152d. As illustrated in FIG. 10, a circular recessed portion 151b is formed in an inner surface of the standing wall 151 of the outer case element 45, and the bend portion 152d is fitted into the recessed portion 151b so as to prevent the rotation of the one thrust receiving member 152.

Furthermore, the outer end of the second arm 152c having a wider width in the extending direction, i.e., the end of the portion extending outward beyond the outer periphery of the second helical gear 81, includes a bend portion 152e that is bent at substantially a right angle so as to be parallel to the tooth width of the second helical gear 81. The bend portion 152e faces the outer edge of the second helical gear 81. This prevents the one thrust receiving member 152 from rotating together when the second helical gear 81 rotates and may prevent the oil in the lower portion of the gear chamber S1 in the axle case 42 from being scooped by the second helical gear 81. This may reduce agitation resistance of the oil and thus reduce the energy loss of the power transmission unit 41.

As illustrated in FIG. 6, the other thrust receiving member 153 is shaped like a pad and is fitted into a recessed portion 154 that has substantially a rectangular shape in cross-section and is formed on a side surface of the inner case element 44 on the outer case element 45 side, and a portion thereof protrudes toward the outer case element 45 from the open end of the recessed portion 154 and faces the side surface of the second helical gear 81. This may also prevent the second helical gear 81 from being in contact with the axle case 42 and making frictional contact and thus may prevent the axle case 42 from being scraped.

Next, the connection member 74 connecting the motor shaft 72 and the input shaft 60 will be described with reference to FIGS. 4, 8, and 9. As described above, the connection member 74 includes the cylindrical portion 75 including the female spline on the inner periphery thereof. The outer periphery side of one end portion of the cylindrical portion 75 is integrally formed with the brake rotor 76 that has a single-plate shape and radially protrudes over the whole periphery. According to the present example, the brake rotor 76 is engaged with the outer sides of both the input shaft 60 and the motor shaft 72 through the cylindrical portion 75 to prevent the brake rotor 76 from rotating relative to the input shaft 60 and the motor shaft 72.

The connection member 74 is formed by sintering to be integrally formed with the brake rotor 76. On both axial sides of the brake rotor 76, a brake shoe 92 and a brake pad 93 are arranged to be opposed to each other, which are pressing portions included in a brake device 90 and are friction materials. When the brake shoe 92 and the brake pad 93 are pressed against the brake rotor 76 on both axial sides, a braking torque is applied to stop the rotation of the input shaft 60 and the motor shaft 72.

Specifically, the brake device 90 includes a braking force generation portion 91 and the brake rotor 76. The brake rotor 76 is provided in a brake rotor housing portion S3 that is defined in the brake chamber S2. In the brake rotor housing portion S3, a circular depression 101, which is slightly larger than the brake rotor 76 in the outer diameter and thickness, is formed on one sidewall surface T1 of the partition wall 150 forming the brake chamber S2, and the brake rotor 76 is located inside the depression 101.

The braking force generation portion 91 applies a braking force to the brake rotor 76. The braking force generation portion 91 includes a brake shaft 94, the brake shoe 92, the brake pad 93, and a brake arm 95 (FIG. 2). The brake pad 93 is held in a pocket on the one sidewall surface T1 located in the depression 101.

The brake shaft 94 extends in the vertical direction in the upper portion of the inner case element 44 and is rotatably supported by the axle case 42. An upper portion of the brake shaft 94 protrudes outward from an upper surface of the inner case element 44. For this, a through-hole 110, which is engaged with the brake shaft 94, is formed in an upper end portion of the inner case element 44 at the position corresponding to a circumferential part of the brake rotor 76 in the front-back direction. An upper portion of the through-hole 110 is larger in diameter than the lower portion thereof, and an O-ring 98 is provided inside to maintain oil sealing.

Furthermore, the lower portion of the brake shaft 94, which passes through the brake chamber S2 and reaches the brake rotor housing portion S3, is provided with a portion that has a semicircular shape in cross-section and includes a cam surface 97 (FIG. 4). For this, openings 110 and 110a (FIG. 8), into which the lower portion of the brake shaft 94 is inserted, are formed separately in the vertical direction in the one sidewall surface T1 described above. Each of the openings 110 and 110a extends in the same direction as the longitudinal direction of the brake shaft 94 and leads to the depression 101. The brake shaft 94 is inserted into only the upper opening 110 out of the openings 110 and 110a. The lower opening 110a is used in an upside-down state with the opening 110a in the upper portion when the axle case 42 is used as an axle case for a right wheel of a vehicle according to another example as described below. The cam surface 97 is opposed to the brake shoe 92 that is movable in the right-left direction of the axle case 42. The brake shoe 92 is provided between the brake shaft 94 and the brake rotor 76, and the surface opposed to the brake rotor 76 serves as a braking surface. The brake shoe 92 has such a shape that two plate-like leg portions protrude from both ends, in the front-back direction, of a plate-like main body portion to the opposite side of the brake rotor 76 and is guided by the brake holder 102 described below.

The brake pad 93 is attached to the partition wall 150 of the inner case element 44. When the cam surface 97 is positioned parallel to the brake shoe 92, the brake shoe 92 is separated from the brake rotor 76 and enters a non-braking state. On the other hand, when the brake shaft 94 rotates and the cam surface 97 is inclined relative to the brake shoe 92, the cam surface 97 is pressed against the brake shoe 92, the brake shoe 92 is guided by the brake holder 102, and the braking surface is ejected from the brake holder 102. Accordingly, the brake rotor 76 is pressed against the brake pad 93 and is sandwiched between the brake shoe 92 and the brake pad 93 on both sides so as to apply a brake with the brake rotor 76 and the transmission system from the input shaft 60 to the left and right wheels 12 and 13 to which the power is transmitted.

The brake arm 95 is attached and fixed to an upper end portion of the brake shaft 94 in a direction perpendicular to the brake shaft 94. A brake operating device (not illustrated) provided in a peripheral portion of the driver's seat is connected to an end portion of the brake arm 95 via a link mechanism. A spring 99 (FIG. 9) is provided between the periphery of the brake shaft 94 on the outer surface of the inner case element 44 and the brake arm 95. Both end portions of the spring 99 are engaged with a first engagement pin (not illustrated), which is fixed to the brake arm 95 and protrudes downward, and a second engagement pin (not illustrated), which is fixed to the inner case element 44 and protrudes upward. Accordingly, the brake shaft 94 is biased in a first rotational direction by the spring 99 through the brake arm 95 so that the cam surface 97 and the brake shoe 92 are arranged parallel and apply no brake.

When the brake operating device of the vehicle is operated in a parking brake position, the end portion of the brake arm 95 moves against the biasing force of the spring 99 and the brake shaft 94 rotates in a second rotational direction in which the cam surface 97 is inclined against the brake shoe 92 and presses the brake shoe 92 against the brake rotor 76. The second rotational direction is opposite to the first rotational direction. Accordingly, the brake device 90 enters a braking state, the rotations of the brake rotor 76 and the wheels 12 and 13 are stopped, and that state is maintained.

Furthermore, the brake holder 102 fixed to the axle case 42 is provided on the opposite side of the brake shoe 92 with respect to the brake shaft 94. The brake holder 102 is provided to allow the brake shoe 92 and the brake pad 93 to be pressed more stably against the brake rotor 76 and thus achieve more stable braking.

The brake holder 102 is made of a metallic material such as iron, steel, or aluminum alloy.

The brake holder 102 includes, in substantially a central portion, a central opening 102a that is a through-hole, through which the cylindrical portion 75 of the connection member 74 passes. The surface of the brake holder 102 opposed to the brake shaft 94 in the thickness direction is provided with a guide surface 103 (FIG. 9) in the vertical direction that has an arc-shape in cross-section and allows part of the brake shaft 94 to enter from the upper side. In two positions apart from each other in the vertical direction on the guide surface 103, grooves 104 are also formed so as to engage and hold the respective leg portions of the brake shoe 92.

The brake holder 102 includes the central opening 102a for inserting the motor shaft 72 and the cylindrical portion 75 at the center in the front, and a bolt 111 that passes through one of two extension portions, which extend in the vertical direction in its rear end portion, and the front end portion are screwed into a screw hole formed in the one sidewall surface T1 so that the brake holder 102 is fixed to the axle case 42. Furthermore, the brake holder 102 includes the guide surface 103 that receives the lower end of the brake shaft 94 and is in contact with the semicircular arc surface thereof opposite to the cam surface 97 and is configured to receive the reaction force of the brake shaft 94 against the brake shoe 92 at the guide surface 103 when the brake is applied.

In order to configure the durable and wet-type pressing mechanism of the brake rotor 76 described above, the oil in the gear chamber S1 also enters the brake chamber S2 through a first oil distribution port 113 on the lower side out of the two first oil distribution ports 113 formed to penetrate in an elongated shape so as to be provided above and below the oil surface La in the partition wall 150 and a second oil distribution port 114 located below the oil surface La. Accordingly, the brake chamber S2 also contains the oil, the brake rotor 76 is subjected to oil bath, and the heat generated during brake application is dissipated through the oil. When the axle case 42 is used as an axle case for the right wheel of the vehicle according to another example as described below, the axle case 42 is turned upside down for the right wheel so that the vertical positions of the first oil distribution ports 113 on the upper and lower sides are reversed and the first oil distribution port 113 on the upper side is located below the oil surface La for use.

While the motor shaft 72 rotates, the brake rotor 76 also rotates, and when the oil in the brake chamber S2 is scooped, this causes agitation resistance and causes energy loss in the power transmission unit 41. Therefore, according to the embodiment, the brake holder 102 is placed over the front surface of the depression 101 while a rear flat portion thereof is in contact with an opening edge of the depression 101 so as to partition a motor side portion S2a (FIG. 4), which is a portion of the brake chamber S2 other than the brake rotor housing portion S3, and the brake rotor housing portion S3. This may restrict the amount of oil in contact with the brake rotor 76 and thus reduce the amount of scooped oil. Therefore, it is possible to decrease the agitation resistance of the oil due to the brake rotor 76 and thus reduce the energy loss in the power transmission unit 41.

As described above, the depression 101 is opened to the motor side portion S2a of the brake chamber S2 through the openings 110 and 110a that are formed in the vertical direction to allow the lower end of the brake shaft 94 to be inserted. Accordingly, when the brake rotor 76 rotates, the surrounding oil is ejected from the open position of the brake rotor housing portion S3 to the motor side portion S2a of the brake chamber S2, for example in the directions of arrows a1 and a2 in FIG. 5 due to the action of centrifugal force. The ejected oil merges with the oil in the motor side portion S2a. As the brake rotor housing portion S3 becomes negatively pressurized due to the ejected oil, the oil in the motor side portion S2a is drawn into the brake rotor housing portion S3 through the gap between the inner peripheral surface of the central opening 102a and the outer peripheral surface of the connection member 74, which facilitates circulation of the oil while being in contact with the brake rotor 76. This facilitates heat dissipation of the brake rotor 76. In this example, the openings 110 and 110a are formed on both upper and lower sides so that the axle case 42 may be turned upside down and shared when the left and right power transmission units 41a and 41b for the vehicle according to another example are configured as illustrated in FIGS. 15 to 17 below; however, if sharing is not considered, the opening 110a may be omitted.

Furthermore, in this example, the axle case 42 is symmetrical with respect to the center in the vertical direction so as to be used upside down. Thus, as illustrated in FIG. 9, a lower through-hole 110a is formed in the inner case element 44 at a lower end position that corresponds to the upper through-hole 110, with which the brake shaft 94 is engaged, in the front-back direction and the right-left direction and that is aligned in the vertical direction such that it is symmetrical with respect to the center of the axle case 42 in the vertical direction, and the through-hole 110a is closed by a cap 115. The shapes of the upper end portion and the lower end portion of the axle case 42 including the through-holes 110 and 110a are also symmetrical with respect to the center in the vertical direction. When the axle case 42 is turned upside down, the lower through-hole 110a in FIG. 9 is located on the upper side and the brake shaft 94 may be inserted and replaced in that position, and the upper through-hole 110 in FIG. 9 is located on the lower side and the cap 115 may be attached. As illustrated in FIGS. 6 and 9, the partition wall 150 also includes the second oil distribution port 114 on the upper side so as to be symmetrical with the second oil distribution port 114 below the oil surface La. Holding portions of the brake pad 93 and the brake shoe 92 are also provided at vertical symmetrical positions in the one sidewall surface T1 and the brake holder 102, respectively, and are replaced when the axle case 42 is turned upside down.

As illustrated in FIGS. 5 and 6, the two through-holes 84 for inserting the right end portion of the intermediate gear shaft 82 are formed at symmetrical positions with respect to the center of the inner case element 44 in the vertical direction. Furthermore, as illustrated in FIG. 7, the two recessed portions 151a and 151b for inserting the left end portion of the intermediate gear shaft 82 are formed at symmetrical positions with respect to the center of the outer case element 45 in the vertical direction. Furthermore, as illustrated in FIG. 6, the recessed portions 154 for mounting the other thrust receiving member 153, which is opposed to one side of the second helical gear 81 in the axial direction, are formed in the wall portion of the inner case element 44 at the symmetrical positions with respect to the center in the vertical direction. Thus, when the power transmission unit 41b (FIG. 17) for the right wheel of the vehicle according to another example described below is configured, the axle case 42 may be turned upside down and shared. In the outer case element 45 illustrated in FIG. 7, the bend portion 152d provided on part of the thrust receiving member 152 described above is inserted into the recessed portion 151b that is located above the oil surface La out of the two recessed portions 151a and 151b. This achieves effective use of the recessed portion 151b for sharing.

As illustrated in FIGS. 9 and 10, in the brake chamber S2 of the inner case element 44, at the positions aligned in the vertical direction in the upper end portion and the lower end portion located behind the through-hole 110, a circular vertical hole 157, which is formed in the vertical direction, and a narrow elongated horizontal hole 158, which is connected to the inner end of the vertical hole 157 and extends toward the electric motor 70, are provided so as to be symmetrical with respect to the center in the vertical direction.

One end of the horizontal hole 158 leads to the brake chamber S2. An air breather device 117 is inserted and attached to an outer end opening of the upper vertical hole 157. The air breather device 117 is provided to prevent liquid such as water, dust, and the like, from entering the axle case 42 and to allow suction and discharge of air in and out of the axle case 42. When the internal pressure rises due to oil expansion in the axle case 42, the air is discharged out of the axle case 42 through the air breather device 117 so as to prevent an excessive increase in the internal pressure. The outer end opening of the lower vertical hole 157 is closed by a cap 115a.

When the axle case 42 is turned upside down, the vertical hole 157 and the horizontal hole 158 on the lower side in FIG. 9 are located on the upper side so that the air breather device 117 may be attached to the vertical hole 157 on the upper side, while the vertical hole 157 and the horizontal hole 158 on the upper side in FIG. 9 are located on the lower side so that the cap 115a may be attached to the vertical hole 157 on the lower side.

In this example, the lower end of the vertical hole 157 is connected to the horizontal hole 158 without penetrating the axle case 42 in the vertical direction, and therefore it is possible to prevent the oil in the brake chamber S2 from splashing and penetrating deep inside the vertical hole 157. Therefore, it is possible to ensure the long-term reliability of the air breather device 117.

As illustrated in FIG. 5, an oil observation hole 159 penetrating in the right-left direction is formed at the area that is not covered by a flange 136 of the second axle case 130 in substantially the center portion in the vertical direction in a wall portion of the inner case element 44 near an attachment portion of the flange 136. The inner end of the oil observation hole 159 leads to the gear chamber S1. A bolt 160 serving as an oil observation plug is screwed into the oil observation hole 159 to close the oil observation hole 159. With the bolt 160 removed, it is checked whether the state is any of the following: a state where only a small amount of oil in the axle case 42 leaks out, and a state immediately before the oil leaks out, so that it may be confirmed that the oil surface La is properly located near the lower end of the oil observation hole 159. The oil observation hole 159 may also be used as a hole for injecting the oil into the axle case 42. The oil may be injected into the axle case 42 by using the vertical hole 157 and the horizontal hole 158 for mounting the air breather device 117.

As illustrated in FIG. 6, in the partition wall 150 of the inner case element 44, a flat-plate permanent magnet 161 is held by an engagement groove 162 at a position below the oil surface La in the gear chamber S1 where the input shaft 60 is provided. The permanent magnet 161 adsorbs metallic foreign objects such as iron powder in the oil. In order to achieve sharing of the axle case in the power transmission unit 41b for the right wheel of the vehicle according to another example, the different engagement groove 162 from the above-described engagement groove 162 is also formed at a symmetrical position with respect to the center of the inner case element 44 in the vertical direction.

FIG. 11 is an enlarged cross-sectional view of the differential gear mechanism 118 in FIG. 3 and its vicinity. FIG. 12 is a perspective view illustrating a state immediately before the second axle case 130 is attached to the inner case element 44 of the first axle case 43. As illustrated in FIGS. 11 and 12, the above-described bushing 147 is provided between the circular cylindrical portion 135 formed on the inner end portion of the second axle case 130 and the second axle 19.

A large-diameter cylindrical surface 163, which has a diameter larger than that of the inner peripheral surface of the second axle case 130 on the center side in the axial direction, is formed on the inner peripheral surface of the circular cylindrical portion 135 in the inner end portion of the second axle case 130 in the axial direction, and the bushing 147 is engaged with the large-diameter cylindrical surface 163. One axial end of the bushing 147 is opposed to a stepped surface 163a formed at the back side of the large-diameter cylindrical surface 163 of the second axle case 130 so that the axial movement of the bushing 147 is restricted. As illustrated in FIG. 3, the bushing 148 is provided between the inner peripheral surface of the outer end portion of the cylindrical portion 131 of the second axle case 130 and the second axle 19, and a sealing member 164 is provided between the inner peripheral surface of the cylindrical portion 131 further outside the bushing 148 and the second axle 19 to prevent oil leakage.

Of the two bushings 147 and 148 provided on both end portions of the second axle case 130, the outer diameter of the bushing 147 on the inner end side is larger than that of the bushing 148 on the outer end side. On both sides of the cylindrical portion 131 of the second axle case 130, two tapered surfaces 165a and 165b are formed with a gradually decreasing inner diameter from the back ends of the installation positions of the bushings 147 and 148 to the position on the right side with respect to the center of the cylindrical portion 131 in the axial direction. Of the two tapered surfaces 165a and 165b, the axial length of the tapered surface 165a on the inner end side is longer than that of the tapered surface 165b on the outer end side. Each of the tapered surfaces 165a and 165b is provided to facilitate cast removal during casting of the second axle case 130. Thus, the axial length of the second axle case 130 may be increased while an inexpensive small-diameter bushing is used as the bushing 148 on the outer end side.

Furthermore, as illustrated in FIGS. 11 and 12, the portion protruding inward in the axial direction beyond the bushing 147 in the inner end portion of the second axle 19 is passed through a thrust washer 166 and a substantially C-shaped retaining ring 167 and is then fitted into a center hole of the side bevel gear 124 on the right by a spline. Thus, the side bevel gear 124 is assembled to the second axle 19 so as not to be rotatable relative thereto, i.e., so as to rotate together. For this purpose, the thrust washer 166 is provided between the side bevel gear 124 and the first axle case 43. The thrust washer 166 is made of iron, steel, or the like, and has higher hardness than the first axle case 43. The thrust washer 166 is prevented from rotating by a retaining boss portion 168 that is a rib formed on the inner surface of the inner case element 44 of the first axle case 43.

As illustrated in FIG. 12, on the inner surface of the inner case element 44, the retaining boss portion 168 is formed of an inwardly protruding cylindrical portion on an opening edge portion of the rear opening 47, which is engaged with the circular cylindrical portion 135 of the second axle case 130. Engagement recessed portions 169 having a shape of substantially a right-angled triangle in cross-section are formed at four positions in the circumferential direction on the inner periphery of the end surface of the retaining boss portion 168. The back end of the engagement recessed portion 169 does not reach the outer surface of the wall portion of the inner case element 44. The four engagement recessed portions 169 are shaped to match four corner portions of the rectangle. The thrust washer 166 is a metal plate having substantially a U-shape in cross-section with ends of two parallel leg portions connected by a connection portion, and protrusions are formed at four positions on the outer surfaces of both end portions of the leg portions. The four protrusions are engaged with the engagement recessed portions 169 of the retaining boss portion 168 so that the thrust washer is prevented from rotating relative to the inner case element 44.

The retaining ring 167 is engaged with a retaining groove provided around the entire periphery of the outer peripheral surface of the portion, penetrating the thrust washer 166, of the inner end portion of the second axle 19 so that the second axle 19 is prevented from being removed out of the first axle case 43.

A radial oil groove 170 reaching both the inner and outer peripheral surfaces is formed in a circumferential part of the end surface of the circular cylindrical portion 135 of the second axle case 130 at the position below the oil surface when in use. As illustrated in FIG. 11, a radial inner end of the radial oil groove 170 is connected to an axial oil groove 171 extending to the back side in the axial direction of the second axle case 130, and the back end of the axial oil groove 171 extends further to the back side beyond the stepped surface 163a of the second axle case 130 and is opened to a second axle placement space S4 whose both ends in the axial direction are closed by bushings in the second axle case 130. While the thrust washer 166 is engaged with the retaining boss portion 168, the radial outer end of the radial oil groove 170 is provided at a position that is not covered by the thrust washer 166. This allows the oil in the first axle case 43 to be distributed to the second axle placement space S4 through the radial oil groove 170 and the axial oil groove 171. Thus, the oil in the first axle case 43 achieves the smoothness of a rotary support portion of the second axle 19.

As described above, the thrust washer 166 is provided between the inner case element 44 and the side bevel gear 124, which is assembled to the second axle 19 so as not to be rotatable relative thereto, and the thrust washer 166 is prevented from rotating by the retaining boss portion 168. Accordingly, even when the side bevel gear 124 rotates in accordance with the rotation of the electric motor 70 and a thrust force is applied in the axial direction to the side bevel gear 124, the thrust force of the side bevel gear 124 may be received by the thrust washer 166 having high hardness. This may prevent direct sliding contact of the side bevel gear 124 with the inner case element 44. Thus, the inner case element 44 may be prevented from being scraped by the side bevel gear 124 while the inner case element 44 may be made of a material having lower hardness, such as aluminum or aluminum alloy.

In FIG. 6, two sets of the radial oil grooves 170 and the axial oil grooves 171 are formed at two positions symmetrical to the vertical direction of the end surface of the circular cylindrical portion 135 of the second axle case 130. Of the two sets, the upper set of the radial oil groove 170 and the axial oil groove 171 may be omitted. When the two sets of the radial oil grooves 170 and the axial oil grooves 171 are formed, the installation side of the motor case 50 of the power transmission unit 41 may be reversed in the vertical direction as it is reversed in the right-left direction, and in that case, the upper set of the radial oil groove 170 and the axial oil groove 171 in FIG. 6 may be located below the oil surface.

FIG. 13 is a perspective view illustrating a state immediately before the thrust washer 166 is attached to the inner side of the outer case element 45 of the first axle case 43 and the retaining ring 167 is engaged with the first axle 18. As illustrated in FIGS. 11 and 13, the retaining boss portion 172 is formed to protrude on the inner surface opposed to the side bevel gear 124 on the left side of the outer case element 45. The retaining boss portion 172 has a shape of protrusions that have L-shaped cross-sectional corner portions in ends and protrude outward in the radial direction at four circumferential positions of the outer periphery of the cylinder. Accordingly, at the four circumferential positions on the end surface of the retaining boss portion 172, the corner portions having an L-shape in cross-section protrude in the axial direction, and engagement recessed portions 173 having a shape of substantially a right-angled triangle in cross-section are formed inside the corner portions. The four engagement recessed portions 173 are shaped to match the four corner portions of the rectangle.

The bushing 145 is provided between the inner peripheral surface of the inner end portion of the outer case element 45 including the retaining boss portion 172 and the first axle 18. A large-diameter cylindrical surface 174, which has a diameter larger than that of the inner peripheral surface on the center side in the axial direction, is formed on the inner peripheral surface of the inner end portion of the outer case element 45, and the bushing 145 is engaged with the large-diameter cylindrical surface 174. One axial end of the bushing 145 is opposed to a stepped surface 174a formed on the back side of the large-diameter cylindrical surface 174 in the cylindrical portion 49 so that the axial movement of the bushing 145 is restricted. As illustrated in FIG. 3, two tapered surfaces 175a and 175b with the diameter decreasing toward the middle portion in the axial direction are also formed on the inner side of the cylindrical portion 49. Of the two bushings 145 and 146 provided on both end portions of the cylindrical portion 49, the outer diameter of the bushing 145 on the inner end side is slightly larger than that of the bushing 146 on the outer end side.

The portion protruding inward in the axial direction beyond the bushing 145 in the inner end portion of the first axle 18 is passed through the thrust washer 166 and the retaining ring 167 and is then fitted into the center hole of the side bevel gear 124 on the left by the spline, and the side bevel gear 124 is assembled to the first axle 18 so as not to be rotatable relative thereto. This also places the thrust washer 166 between the side bevel gear 124 and the outer case element 45. The thrust washer 166 for the first axle 18 is similar to the thrust washer 166 for the second axle 19 and is prevented from rotating by the retaining boss portion 172 described above. The structure allowing the oil in the first axle case 43 to be distributed to a first axle space S5 in the cylindrical portion 49 is similar to that on the second axle 19 side. Accordingly, the outer case element 45 may be prevented from being scraped by the side bevel gear 124 while the outer case element 45 may be made of a material having lower hardness, such as aluminum or an aluminum alloy.

Figure 14:
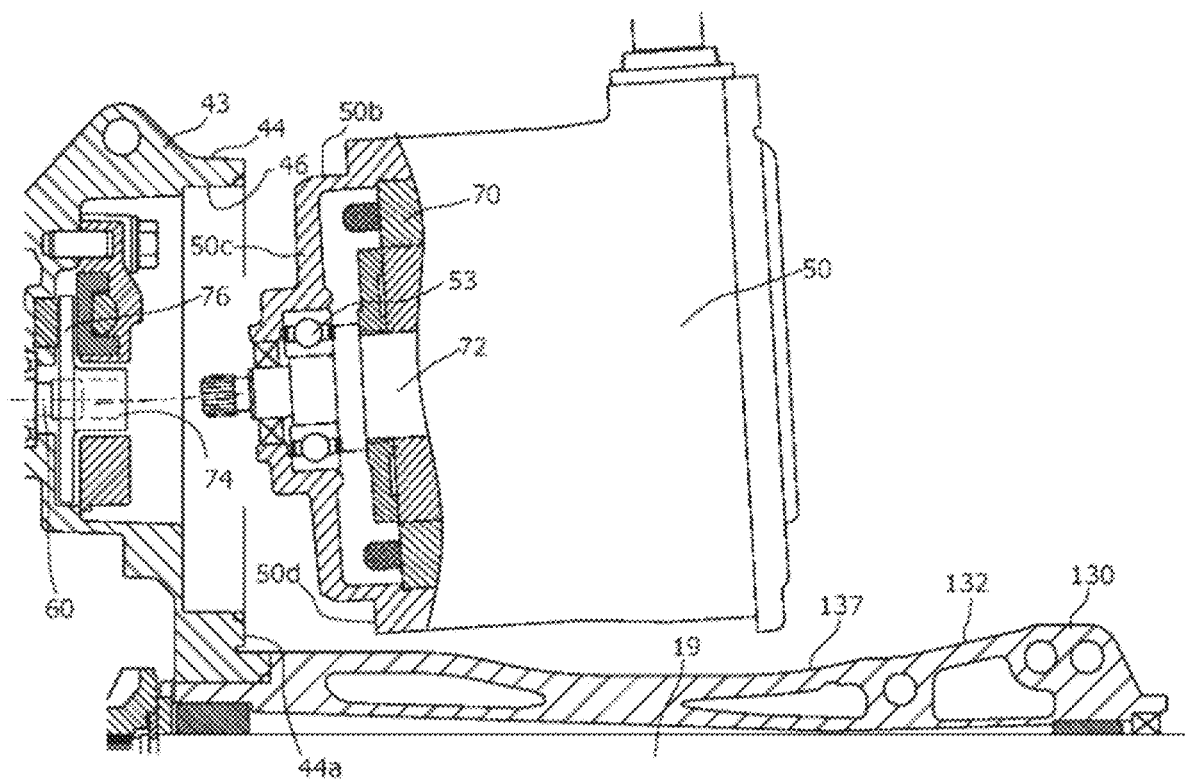
FIG. 14 is an enlarged view of a right portion of FIG. 2, illustrating a state immediately before the motor case is attached to the first axle case.

FIG. 14 is an enlarged view of a right portion of FIG. 2, illustrating a state immediately before the motor case 50 is attached to the first axle case 43. As illustrated in FIG. 14, to attach the motor case 50 to the first axle case 43, the motor case 50 is placed outside the front opening 46 of the first axle case 43 in a state where the motor shaft 72 provided inside the motor case 50 is inclined with respect to the input shaft 60 so as to avoid the interference between the motor case 50 and the second axle case 130. From this state, the motor case 50 is brought closer to the inner side of the front opening 46 while the inclination of the motor shaft 72 with respect to the input shaft 60 is gradually decreased, and the fitting cylindrical portion 50b in the inner end portion of the motor case 50 is fitted into the front opening 46. In the fitting state between the front opening 46 and the motor case 50, the motor case 50 is pushed further into the front opening 46 until a stepped surface 50d formed at the back end of the fitting cylindrical portion 50b is butted against the first fixing surface 44a of the first axle case 43. Then, the bolts 59 (FIG. 2) passing through a flange of the motor case 50 are screwed into screw holes formed in the first axle case 43 so that the motor case 50 is fixed to the first axle case 43. In this state, part of the motor case 50 enters the recessed portion 137 formed in the portion of the second axle case 130 opposed to the motor case 50. This allows the electric motor 70 to be closer to the second axle 19 as described above, which achieves a reduction in the size of the power transmission unit 41.

With the power transmission unit 41 described above, the second axle case 130, which houses the second axle 19 on the same side as the electric motor 70 with respect to the center between the first axle 18 and the second axle 19 on left and right, is fixed to the first axle case 43, which houses the reduction gear mechanism 78, the differential gear mechanism 118, and the first axle 18, in a separable manner. This eliminates the need to provide the connection portion between the axle case portion housing the second axle 19 and the gear cover portion in a single cast, so that the first fixing surface 44a, which is a fixing surface of the motor case 50, may be formed in the first axle case 43 while maintaining the necessary configuration of the mold, even when the electric motor 70 is placed close to the second axle 19. Thus, while the inner case element 44 and the outer case element 45 of the axle case 43, which houses the first axle 18, the second axle 19, and the gear mechanism, may be formed by die-casting, a reduction in the size of the power transmission unit 41 is achieved.

On the other hand, it is possible that the portion connecting the second axle case portion and the gear cover portion is provided in a single cast in the case, but in that case, it is typical to ensure the strength by forming a curved portion having a large radius of curvature in the above connection portion. However, in this case, the presence of the curved portion makes it difficult to move the fixed portion of the motor case closer to the axle. According to the embodiment, such an inconvenience may be prevented.

Furthermore, for the first axle case 43, the inner case element 44 on the electric motor 70 side and the outer case element 45 on the opposite side of the electric motor 70 are fixed to each other by screwing. Therefore, even when the first axle case 43 has a complex shape, it is easy to form the inner case element 44 and the outer case element 45 by die-casting, and thus the first axle case 43 may be easily formed.

The outer case element 45 is obtained by integrally molding the cylindrical portion 49, which is the axle case portion housing the first axle 18, and the cover portion 140 covering one axial end of the reduction gear mechanism 78. This reduces the number of components forming the axle case 42 and thus may reduce the manufacturing cost of the power transmission unit 41.

FIG. 15 is a partially exploded perspective view illustrating formation of the power transmission unit for the left wheel of another vehicle by using a part of the components forming the power transmission unit in FIG. 2. FIG. 16 is a cross-sectional view of the power transmission unit for the left wheel illustrated in FIG. 15. FIG. 17 is a partially omitted perspective view illustrating formation of the power transmission unit for the right wheel of another vehicle by using a part of the components forming the power transmission unit.

The power transmission units 41a and 41b for the left and right wheels of the vehicle according to another example as illustrated in FIGS. 15 to 17 may be configured by using a part of the components of the power transmission unit 41 illustrated in FIGS. 1 to 14 above. In the vehicle according to another example, the right and left wheels are independently driven by the two electric motors 70 on the right and left sides. In such a vehicle, for example, two right and left operating levers provided on the right and left sides of the driver's seat are used as acceleration instruction units and turning instruction units. The right and left operating levers are configured to swing backward and forward about an axis along the right-left direction. Each of the operating levers may be tilted forward to rotate the electric motor 70 on the corresponding right or left side in the forward direction and may be tilted backward to rotate the electric motor 70 on the corresponding side in the backward direction. The vehicle may turn and run by changing the swing position of the right and left operating levers to the front.

As illustrated in FIGS. 15 and 16, to configure the power transmission unit 41a for the left wheel, the second axle case 130 is removed from the power transmission unit 41 in FIGS. 1 to 14, and instead the cover member 180 is fixed to the first axle case 43 by screwing the bolt 59. Thus, the rear opening 47 of the first axle case 43 is closed by the cover member 180.

As illustrated in FIG. 16, in the cover member 180, a cylindrical portion 182 having a cylindrical shape protrudes from an inner surface of a cover main body 181 having a rectangular plate shape. While the cylindrical portion 182 is fitted into the rear opening 47, the cover main body 181 is butted against the second fixing surface 44b of the inner case element 44, and the cover member 180 is fixed to the inner case element 44 with the bolts 59 passing through the cover main body 181. A left axle 183 passes through the cylindrical portion 49 of the outer case element 45, and a hub 184 for fixing the wheel is fixed to the portion protruding from the cylindrical portion 49. The left axle 183 is rotatably supported by the first axle case 43 with a bushing 185 provided inside the outer end portion of the cylindrical portion 49 and a bushing 186 supported on the inner peripheral surface of the cylindrical portion 182 of the cover member 180. A portion of the left axle 183 located in the gear chamber is fixed to an output gear 187 so as not to be rotatable relative thereto. The output gear 187 is meshed with the intermediate gear portion of the intermediate gear shaft 82. The first helical gear 79 provided on the input shaft 60, the second helical gear 81 provided on the intermediate gear shaft 82, and the output gear 187 meshed with the intermediate gear portion constitute the reduction gear mechanism 78a. The power of the electric motor 70 is transmitted to the left axle 183 via the reduction gear mechanism 78a to rotate the wheel fixed to the hub 184.

To configure the power transmission unit for the right wheel illustrated in FIG. 17, the first axle case 43 is turned upside down in the power transmission unit 41a for the left wheel illustrated in FIGS. 15 and 16. The brake shaft, the brake arm 95, and the air breather device 117 are then mounted on the upper side of the turned first axle case 43. The both end portions of the intermediate gear shaft 82 (FIG. 10) are alternatively attached to the through-hole 84 (FIG. 5) and the recessed portion 151b (FIG. 7) on the lower side.

A right axle 188 for the right wheel is rotatably supported inside the first axle case 43 in the same manner as the left wheel, and a hub 189 for fixing the right wheel is fixed to the portion of the right axle 188 protruding from the cylindrical portion 49 of the outer case element 45. In the power transmission unit 41b for the right wheel, the other configurations are the same as those in the power transmission unit 41a for the left wheel in FIGS. 15 and 16. Thus, the power of the electric motor is thereby transmitted to the right axle 188 via the motor shaft, the input shaft, and the reduction gear mechanism to rotate the wheel fixed to the hub 189.

With the power transmission unit 41 illustrated in FIGS. 1 to 14, a part of the components may be used to configure the power transmission units 41a and 41b for the vehicle according to another example in which the right and left wheels may be independently driven by the two electric motors 70, and it is possible to reduce the manufacturing costs of the power transmission units 41a and 41b according to another example.

In the case described according to the above embodiment, the first helical gear 79, which is an input gear of the reduction gear mechanism, is provided on the input shaft 60 that is provided on the same axis as the motor shaft and is not rotatable relative thereto. However, the input shaft may be a shaft member integrally formed with the motor shaft, and the input gear may be provided on the outer side of the motor shaft in the radial direction.

REFERENCE SIGNS LIST

10 Lawn mowing vehicle
12 Left wheel
13 Right wheel
14 Left wheel
15 Right wheel
16 Main frame
17a, 17b Fixing member
18 First axle
19 Second axle
20 Steering wheel
21 Steering mechanism
25 Lawn mowing device
26 Mower deck
27 Lawn mowing blade
28 Duct
41 Electric-vehicle power transmission unit (power transmission unit)
42 Axle case
43 First axle case
44 Inner case element
45 Outer case element
46 Front opening
47 Rear opening
48 Opening
49 Cylindrical portion
50 Motor case
51, 52, 53 Bearing
54 Seal
55 Cover
58, 59 Bolt
60 Input shaft
63 Hub
70 Electric motor
72 Motor shaft
74 Connection member
75 Cylindrical portion
76 Brake rotor
77 Power transmission mechanism
78, 78a Reduction gear mechanism
79 First helical gear
81 Second helical gear
82 Intermediate gear shaft
83 Intermediate gear portion
84 Through-hole
90 Brake device
91 Braking force generation portion
92 Brake shoe
93 Brake pad
94 Brake shaft
95 Brake arm
98 O-ring
99 Spring
101 Depression
102 Brake holder
103 Guide surface
104 Groove
110, 110a Through-hole
111 Bolt
113 First oil distribution port
114 Second oil distribution port
115, 115a Cap
117 Air breather device
118 Differential gear mechanism
119 Ring gear
120 Sleeve
130 Second axle case
131 Cylindrical portion
132, 133 Wall portion
134 Plate portion
135 Circular cylindrical portion
136 Flange
137 Recessed portion
140 Cover portion
141, 142 Wall portion
143 Plate portion
144 Opening
145 to 148 Bushing
150 Partition wall
151 Standing wall
152, 153 Thrust receiving member
154, 155 Recessed portion
157 Vertical hole
158 Horizontal hole
159 Oil observation hole
160 Bolt
161 Permanent magnet
162 Engagement groove
163 Large-diameter cylindrical surface
164 Sealing member
165a, 165b Tapered surface
166 Thrust washer
167 Retainer ring
168 Retaining boss portion
169 Engagement recessed portion
170 Radial oil groove
171 Axial oil groove
172 Retaining boss portion
173 Engagement recessed portion
174 Large-diameter cylindrical surface
180 Cover member
181 Cover main body
182 Cylindrical portion
183 Left axle
184 Hub
185, 186 Bushing
187 Output gear
188 Right axle
189 Hub

The invention claimed is:

1. An electric-vehicle power transmission unit in which power of an electric motor is transmitted to a first axle and a second axle separated to right and left through a reduction gear mechanism and a differential gear mechanism, the electric-vehicle power transmission unit comprising:
- a motor case that is provided on a same side as the second axle with respect to a center between the first axle and the second axle in a right-left direction and that houses the electric motor;
- a first axle case housing the reduction gear mechanism, the differential gear mechanism, and the first axle; and
- a second axle case housing the second axle that is longer than the first axle that is fixed to the first axle case in a separable manner and houses the second axle;
- wherein
  - a recessed portion is formed in a portion of the second axle case opposed to the motor case, and
  - part of the motor case enters the recessed portion.

2. The electric-vehicle power transmission unit according to claim 1, wherein the first axle case is formed by fixing an inner case element on a side of the electric motor and an outer case element on a side of the inner case element opposite the electric motor by screwing, such that the inner case element is disposed between the outer case element and the electric motor, wherein the first axle case houses the first axle that is shorter than the second axle and has the outer case element formed therewith.

3. The electric-vehicle power transmission unit according to claim 2, wherein the outer case element is obtained by integrally molding an axle case portion housing the first axle and a cover portion covering one side end of the reduction gear mechanism in an axial direction.

4. The electric-vehicle power transmission unit according to claim 1, wherein
- the electric motor includes a motor shaft extending in a vehicle right-left direction parallel to an extending direction of the first axle and the second axle,
- the reduction gear mechanism includes:
  - an input gear provided on the motor shaft or an input shaft that is provided on a same axis as the motor shaft and is not rotatable relative thereto,
  - an intermediate gear shaft including an intermediate gear that is meshed with the input gear, and
  - an intermediate gear portion that is provided on the intermediate gear shaft and is meshed with a ring gear provided on an outer peripheral side of the differential gear mechanism,
- the motor shaft is offset from the first axle and the second axle, and extends parallel to the first axle and the second axle, and
- the intermediate gear shaft is provided at a different position with respect to the first axle, the second axle, and the motor shaft in the second direction.

5. An electric-vehicle power transmission unit in which power of an electric motor is transmitted to a first axle and a second axle separated to right and left through a reduction gear mechanism and a differential gear mechanism, the electric-vehicle power transmission unit comprising:
- a motor case that is provided on a same side as the second axle with respect to a center between the first axle and the second axle in a right-left direction and that houses the electric motor;
- a first axle case housing the reduction gear mechanism, the differential gear mechanism, and the first axle; and
- a second axle case that is fixed to the first axle case in a separable manner and houses the second axle, wherein
- a thrust washer is provided between the first axle case and a side bevel gear assembled to the second axle so as not to be rotatable relative thereto, and
- the thrust washer has higher hardness than the first axle case and is prevented from rotating by an engagement recessed portion formed in the first axle case.

* * * * *